United States Patent
Aarsland et al.

(10) Patent No.: US 11,391,142 B2
(45) Date of Patent: Jul. 19, 2022

(54) SUPERVISORY CONTROL SYSTEM FOR A WELL CONSTRUCTION RIG

(71) Applicant: Schlumberger Technology Corporation, Sugar Land, TX (US)

(72) Inventors: Njaal Aarsland, Kristiansand (NO); Shunfeng Zheng, Katy, TX (US); Anstein Jorud, Kristiansand (NO); Jason Bryant, Katy, TX (US); Loic Hoarau, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 128 days.

(21) Appl. No.: 16/599,609

(22) Filed: Oct. 11, 2019

(65) Prior Publication Data
US 2021/0108499 A1    Apr. 15, 2021

(51) Int. Cl.
*E21B 44/00*    (2006.01)
*H04N 7/18*    (2006.01)
*G05B 15/02*    (2006.01)
*H04N 5/232*    (2006.01)

(52) U.S. Cl.
CPC ............. *E21B 44/00* (2013.01); *H04N 7/181* (2013.01); *G05B 15/02* (2013.01); *H04N 5/232* (2013.01)

(58) Field of Classification Search
CPC ......... E21B 44/00; E21B 44/02; H04N 7/181; H04N 5/232; G05B 15/02
See application file for complete search history.

(56) References Cited

U.S. PATENT DOCUMENTS

| | | |
|---|---|---|
| 6,484,816 B1 | 11/2002 | Koederilz |
| 6,892,812 B2 | 5/2005 | Niedermayr et al. |
| 6,896,055 B2 | 5/2005 | Koithan |
| 6,931,621 B2 | 8/2005 | Green et al. |
| 7,172,037 B2 | 2/2007 | Dashevskiy et al. |
| 7,264,050 B2 | 9/2007 | Koithan et al. |
| 7,357,196 B2 | 4/2008 | Goldman et al. |

(Continued)

FOREIGN PATENT DOCUMENTS

| | | |
|---|---|---|
| WO | 2016102381 A1 | 6/2016 |
| WO | 2017116474 A1 | 7/2017 |

(Continued)

*Primary Examiner* — Rowina J Cattungal
(74) *Attorney, Agent, or Firm* — Alec J. McGinn

(57) ABSTRACT

A supervisory control system for a well construction rig operable to perform well construction operations to construct a planned well at a wellsite. The supervisory control system may be installable in association with the well construction rig. The supervisory control system may comprise a supervisory controller communicatively connectable with a central controller of a rig control system of the well construction rig. The rig control system may be communicatively connected with and operable to control well construction equipment of the well construction rig. The supervisory controller may be operable to control the well construction equipment via the rig control system to cause the well construction equipment to perform the well construction operations. The central controller may be operable as an I/O interface for matching inputs and outputs of the supervisory controller with corresponding inputs and outputs of at least one piece of the well construction equipment.

20 Claims, 6 Drawing Sheets

(56) References Cited

U.S. PATENT DOCUMENTS

| | | |
|---|---|---|
| 7,860,593 B2 | 12/2010 | Boone |
| 7,938,197 B2 | 5/2011 | Boone et al. |
| 8,121,971 B2 | 2/2012 | Edwards et al. |
| 8,215,417 B2 | 7/2012 | Annaiyappa et al. |
| 8,250,816 B2 | 8/2012 | Donnally et al. |
| 8,386,059 B2 | 2/2013 | Boone |
| 8,590,635 B2 | 11/2013 | Koederilz |
| 8,718,802 B2 | 5/2014 | Boone |
| 9,027,671 B2 | 5/2015 | Koederilz |
| 9,223,594 B2 | 12/2015 | Brown et al. |
| 9,285,794 B2 | 3/2016 | Wang et al. |
| 9,322,247 B2 | 4/2016 | Rojas et al. |
| 9,410,417 B2 | 8/2016 | Reckmann et al. |
| 9,429,009 B2 | 8/2016 | Paulk et al. |
| 9,436,173 B2 | 9/2016 | Wang et al. |
| 9,506,336 B2 | 11/2016 | Orbell |
| 9,528,364 B2 | 12/2016 | Samuel et al. |
| 9,593,567 B2 | 3/2017 | Pink et al. |
| 9,598,947 B2 | 3/2017 | Wang et al. |
| 9,784,089 B2 | 10/2017 | Boone et al. |
| 9,828,845 B2 | 11/2017 | Kpetehoto et al. |
| 9,896,925 B2 | 2/2018 | Hernandez et al. |
| 9,933,919 B2 | 4/2018 | Raja et al. |
| 9,934,338 B2 | 4/2018 | Germain et al. |
| 9,946,445 B2 | 4/2018 | Whalley |
| 9,995,129 B2 | 6/2018 | Dykstra et al. |
| 10,049,474 B2 | 8/2018 | Germain et al. |
| 10,113,408 B2 | 10/2018 | Pobedinski et al. |
| 10,138,722 B2 | 11/2018 | Magnuson |
| 10,161,226 B2 | 12/2018 | Bagnaro |
| 10,209,400 B2 | 2/2019 | Bermudez Martinez et al. |
| 10,221,671 B1 | 3/2019 | Zhang |
| 10,253,612 B2 | 4/2019 | Dashevskiy et al. |
| 10,260,332 B2 | 4/2019 | Israel et al. |
| 10,273,752 B2 | 4/2019 | Mebane, III |
| 10,294,770 B2 | 5/2019 | Anghelescu et al. |
| 10,301,923 B2 | 5/2019 | Andresen et al. |
| 10,370,902 B2 | 8/2019 | Hadi |
| 10,370,911 B2 | 8/2019 | Curry et al. |
| 10,378,318 B2 | 8/2019 | Gleitman et al. |
| 10,378,329 B2 | 8/2019 | Boone |
| 10,392,918 B2 | 8/2019 | Harkless et al. |
| 10,400,572 B2 | 9/2019 | Lovorn et al. |
| 10,400,586 B2 | 9/2019 | Bittar et al. |
| 10,415,362 B1 | 9/2019 | Basu et al. |
| 10,415,364 B2 | 9/2019 | Kyllingstad |
| 10,415,366 B2 | 9/2019 | Boone |
| 10,422,912 B2 | 9/2019 | Holtz |
| 10,428,637 B2 | 10/2019 | Abbassian et al. |
| 10,428,638 B2 | 10/2019 | Miller |
| 10,443,329 B2 | 10/2019 | Savage et al. |
| 10,458,223 B2 | 10/2019 | Badkoubeh et al. |
| 10,493,383 B2 | 12/2019 | Teodorescu |
| 10,539,001 B2 | 1/2020 | Kpetehoto et al. |
| 2008/0289877 A1* | 11/2008 | Nikolakis-Mouchas ............... E21B 44/00 702/9 |
| 2013/0022476 A1* | 1/2013 | Villareal ............... F04B 53/14 417/53 |
| 2014/0005996 A1* | 1/2014 | Jain ............... G06T 19/20 703/10 |
| 2014/0116776 A1* | 5/2014 | Marx ............... E21B 49/00 706/11 |
| 2015/0369030 A1 | 12/2015 | Hay et al. |
| 2016/0097270 A1* | 4/2016 | Pobedinski ............ G05B 17/02 700/275 |
| 2016/0290119 A1* | 10/2016 | Tunc ............... G05B 19/0421 |
| 2017/0101827 A1* | 4/2017 | Orban ............... E21B 33/14 |
| 2017/0308802 A1 | 10/2017 | Ramsoy et al. |
| 2017/0328179 A1* | 11/2017 | Dykstra ............... E21B 49/008 |
| 2018/0135401 A1 | 5/2018 | Dykstra et al. |
| 2018/0156023 A1 | 6/2018 | Dykstra et al. |
| 2018/0283137 A1 | 10/2018 | Peyregne et al. |
| 2018/0283138 A1 | 10/2018 | Peyregne et al. |
| 2018/0298693 A1 | 10/2018 | Van Duivendijk et al. |
| 2018/0298694 A1 | 10/2018 | Van Duivendijk et al. |
| 2018/0328159 A1 | 11/2018 | Mandava et al. |
| 2018/0334887 A1 | 11/2018 | Dashevskiy et al. |
| 2019/0032466 A1 | 1/2019 | Wilson et al. |
| 2019/0033845 A1 | 1/2019 | Cella et al. |
| 2019/0048703 A1 | 2/2019 | Samuel et al. |
| 2019/0048704 A1 | 2/2019 | Kumaran |
| 2019/0078425 A1 | 3/2019 | Gillan |
| 2019/0078427 A1 | 3/2019 | Gillan |
| 2019/0078428 A1 | 3/2019 | Fang et al. |
| 2019/0106978 A1 | 4/2019 | Etaje et al. |
| 2019/0128079 A1 | 5/2019 | Omrani |
| 2019/0146118 A1 | 5/2019 | Bermudez Martinez et al. |
| 2019/0153848 A1 | 5/2019 | Ng et al. |
| 2019/0268571 A1 | 8/2019 | Pettersen et al. |

FOREIGN PATENT DOCUMENTS

| | | |
|---|---|---|
| WO | 2017142540 A1 | 8/2017 |
| WO | 2017160993 A1 | 9/2017 |
| WO | 2017187368 A1 | 11/2017 |
| WO | 2017204655 A1 | 11/2017 |
| WO | 2018186745 A1 | 10/2018 |
| WO | 2018213126 A1 | 11/2018 |
| WO | 2019035848 A1 | 2/2019 |
| WO | 2019066932 A1 | 4/2019 |
| WO | 2019173841 A1 | 9/2019 |

* cited by examiner

SUPERVISORY CONTROL SYSTEM FOR A WELL CONSTRUCTION RIG

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (e.g., drilling rig) having various surface and subterranean well construction equipment being operated in a coordinated manner. For example, a drive mechanism, such as a top drive located at a wellsite surface, can be utilized to rotate and advance a drill string into a subterranean formation to drill a wellbore. The drill string may include a plurality of drill pipes coupled together and terminating with a drill bit. Length of the drill string may be increased by adding additional drill pipes while depth of the wellbore increases.

The well construction equipment may be grouped into various subsystems, wherein each subsystem performs a different operation controlled by a corresponding local controller. Each local controller is typically implemented as a standalone controller operable to execute processes associated with the corresponding subsystem. Although wellsite equipment may operate in a coordinated manner, there is little or no communication between the subsystems and their controllers, whereby coordination and/or interactions between the subsystems are typically initiated, monitored, and controlled by rig personnel (i.e., human equipment operators).

The well construction equipment is typically monitored and controlled from a control center of the well construction system. A typical control center houses a control workstation operable to receive sensor data from various sensors associated with the well construction equipment and permit monitoring of the well construction equipment. The control workstation may facilitate manual control of the well construction equipment by rig personnel (e.g., a driller). However, relying on rig personnel to initiate the well construction operations, and to control and monitor coordination between the subsystems limits speed, efficiency, and safety of the well construction operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a supervisory control system installable in association with a well construction rig. The well construction rig is operable to perform well construction operations to construct a planned well at a wellsite. The supervisory control system includes a supervisory controller communicatively connectable with a rig control system of the well construction rig. The rig control system is communicatively connected with and operable to control well construction equipment of the well construction rig. The rig control system includes a rig control workstation usable by personnel to control the well construction equipment. The supervisory controller includes a processing device and a memory storing an executable program code. Execution of the program code by the processing device causes the supervisory controller to select an operational sequence to be performed by the well construction equipment based on operational status of the well construction equipment and a well construction plan input into the supervisory controller. Execution of the program code by the processing device also causes the supervisory controller to control the well construction equipment, via the rig control system, to cause the well construction equipment to perform the selected operational sequence. The supervisory control system also includes a supervisory human-machine interface (HMI) communicatively connected with the supervisory controller. The supervisory HMI is usable by the personnel to control the supervisory control system.

The present disclosure also introduces an apparatus including a supervisory control system installable in association with a well construction rig. The well construction rig is operable to perform well construction operations to construct a planned well at a wellsite. The supervisory control system includes a supervisory controller communicatively connectable with a central controller of a rig control system of the well construction rig. The rig control system is communicatively connected with and operable to control well construction equipment of the well construction rig. The supervisory controller includes a processing device and a memory storing an executable program code. Execution of the program code by the processing device causes the supervisory controller to control the well construction equipment via the rig control system to cause the well construction equipment to perform the well construction operations. The central controller is operable as an input/output (I/O) interface for matching inputs and outputs of the supervisory controller with corresponding inputs and outputs of at least one piece of the well construction equipment.

The present disclosure also introduces an apparatus including a supervisory control system installable in association with a well construction rig. The well construction rig is operable to perform well construction operations to construct a planned well at a wellsite. The supervisory control system includes a supervisory controller communicatively connectable with a rig control system of the well construction rig. The rig control system is communicatively connected with and operable to control well construction equipment of the well construction rig. The supervisory controller includes a processing device and a memory storing an executable program code. Execution of the program code by the processing device causes the supervisory controller to control the well construction equipment, via the rig control system, to cause the well construction equipment to perform the well construction operations. The rig control system includes an I/O interface for matching inputs and outputs of the supervisory controller with corresponding inputs and outputs of at least one piece of the well construction equipment. The rig control system also includes a communication gateway for translating communication between the supervisory controller and the rig control system.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numbers and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

Systems and methods (e.g., processes, operations) according to one or more aspects of the present disclosure may be utilized or otherwise implemented in association with an automated well construction system (i.e., well construction rig) at an oil and gas wellsite, such as for constructing a wellbore to obtain hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

Figure 1:
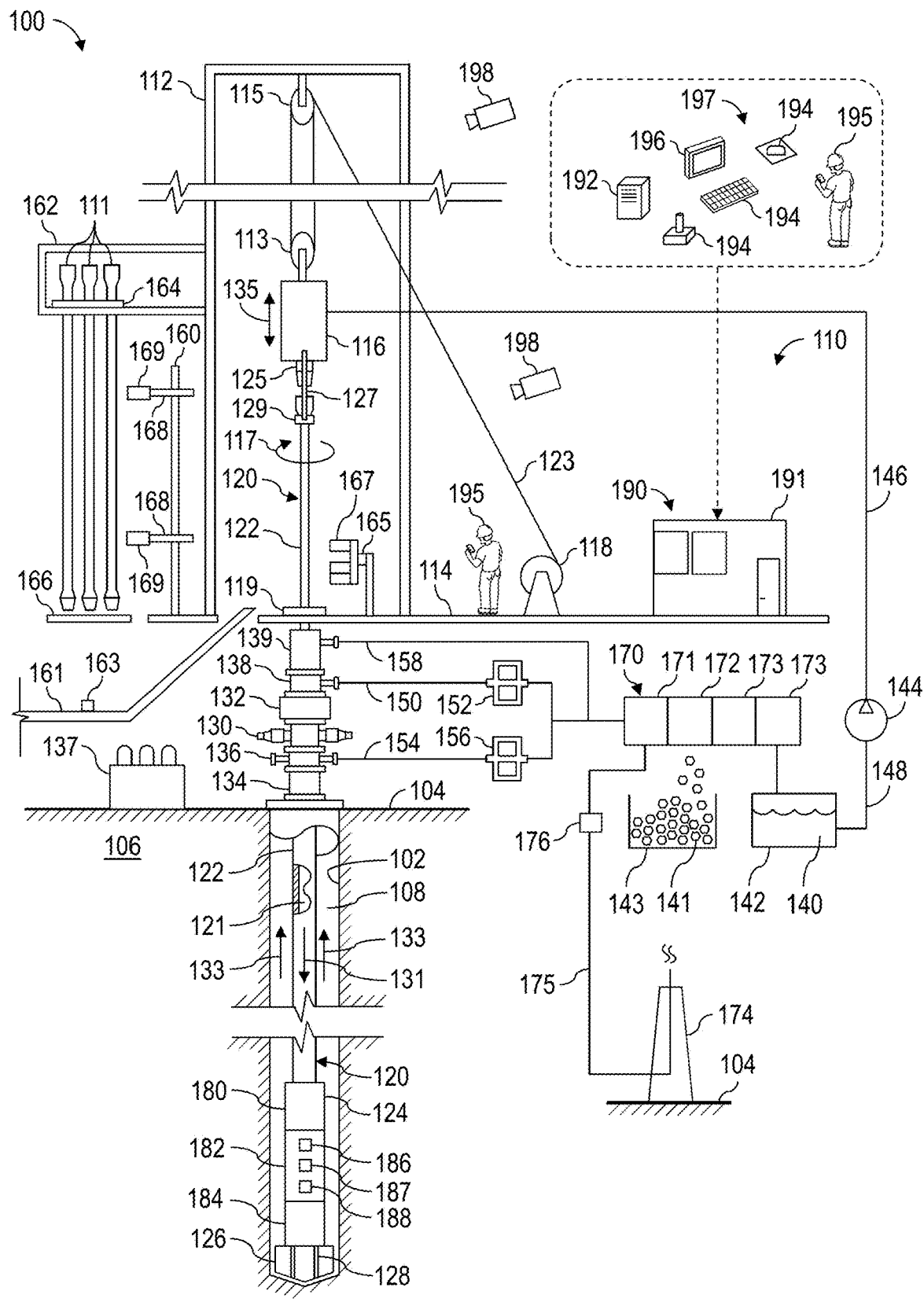
FIG. 1 is a schematic side view of at least a portion of an example implementation of apparatus according to one or more aspects of the present disclosure.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

One or more of the downhole tools 180, 182 may be or comprise an MWD or LWD tool comprising a sensor package 186 operable for the acquisition of measurement data pertaining to the BHA 124, the wellbore 102, and/or the formation 106. One or more of the downhole tools 180, 182 and/or another portion of the BHA 124 may also comprise a telemetry device 187 operable for communication with the surface equipment 110, such as via mud-pulse telemetry. One or more of the downhole tools 180, 182 and/or another portion of the BHA 124 may also comprise a downhole controller 188 (e.g., a processing device) operable to receive, process, and/or store information received from the surface equipment 110, the sensor package 186, and/or other portions of the BHA 124. The downhole controller 188 may also store executable computer programs (e.g., program code instructions), including for implementing one or more aspects of the operations described herein.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an engine or motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control comprising a series of pressure barriers (e.g., rams) between the wellbore 102 and the wellsite surface 104 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals) of the fluid control devices 130, 132, 138.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more drilling fluid pumps 144 (i.e., mud pumps) operable to move the drilling fluid 140 from the container 142 into the fluid passage 121 of the drill string 120 via a fluid conduit 146 extending from the pumps 144 to the top drive 116 and an internal passage extending through the top drive 116. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annulus 108 via different fluid control devices during different phases or scenarios of well drilling operations. For example, the drilling fluid may exit the annulus 108 via a bell nipple 139, the RCD 138, or a ported adapter 136 (e.g., a spool, cross adapter, a wing valve, etc.) located below one or more rams of the BOP stack 130.

During normal drilling operations, the drilling fluid may exit the annulus 108 via the bell nipple 139 and then be directed toward drilling fluid reconditioning equipment 170 via a fluid conduit 158 (e.g., gravity return line) to be cleaned and/or reconditioned, as described below, before being returned to the container 142 for recirculation. During managed pressure drilling operations, the drilling fluid may exit the annulus 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annulus 108 by variably restricting flow of the drilling fluid or other fluids flowing through the choke manifold 152. The greater the restriction to flow through the choke manifold 152, the greater the backpressure applied to the annulus 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annulus 108 via the ported adapter 136 and be directed into a choke manifold 156 (e.g., a rig choke manifold, well control choke manifold) via a fluid conduit 154 (e.g., rig choke line). The choke manifold 156 may include at least one choke and a plurality of fluid valves (neither shown) collectively operable to control the flow of the drilling fluid through the choke manifold 156. Backpressure may be applied to the annulus 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid gas (i.e., mud gas) separators 171, shale shakers 172, and other drilling fluid cleaning and reconditioning equipment 173. The liquid gas separators 171 may remove formation gasses entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify physical properties or characteristics (e.g., rheology) of the drilling fluid. For example, the drilling fluid reconditioning equipment 170 may include a degasser, a desander, a desilter, a centrifuge, a mud cleaner, and/or a decanter, among other examples. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite. A gas sensor 176 (e.g., a carbon tracker) may be connected along the conduit 175 to monitor the quality and/or quantity of gas separated from the drilling fluid and transmitted to the flare stack 174.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (e.g., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated operations (i.e., operational sequences) to drill or otherwise construct the wellbore 102. The operational sequences may change based on a well construction plan, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the iron roughneck 165 is moved away or is otherwise clear of the drill string 120. When the upper end of the drill string 120 (i.e., upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or another area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or another portion of the wellsite system 100. The fingerboard 164/setback 166 provide storage (e.g., temporary storage) of tubulars 111 during various operations, such as during and between tripping out and tripping of the drill string 120. The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100. The control center 190 may comprise a facility 191 (e.g., a room, a cabin, a trailer, etc.) containing a control workstation 197, which may be operated by rig personnel 195 (e.g., a driller or another human rig operator) to monitor and control various wellsite equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface and downhole equipment described herein, and may be operable to receive signals from and transmit signals to such equipment to perform various operations described herein. The central controller 192 may store executable computer program code, instructions, and/or operational parameters or set-points, including for implementing one or more aspects of methods and operations described herein. The central controller 192 may be located within and/or outside of the facility 191.

The control workstation 197 may be operable for entering or otherwise communicating control data (e.g., commands, signals, information, etc.) to the central controller 192 by the rig personnel 195, and for displaying or otherwise communicating information from the central controller 192 to the rig personnel 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

The well construction system 100 also includes stationary and/or mobile video cameras 198 disposed or utilized at various locations within the well construction system 100. The video cameras 198 capture videos of various portions, equipment, or subsystems of the well construction system 100, and perhaps the rig personnel 195 and the actions they perform, during or otherwise in association with the wellsite operations, including while performing repairs to the well construction system 100 during a breakdown. For example, the video cameras 198 may capture videos of the entire well construction system 100 and/or specific portions of the well construction system 100, such as the top drive 116, the iron roughneck 165, the THM 160, the fingerboard 164, and/or the catwalk 161, among other examples. The video cameras 198 generate corresponding video signals (i.e., video feeds) comprising or otherwise indicative of the captured videos. The video cameras 198 may be in signal communication with the central controller 192, such as may permit the video signals to be processed and transmitted to the control workstation 197 and, thus, permit the rig personnel 195 to view various portions or components of the well construction system 100 on one or more of the output devices 196. The central controller 192 or another portion of the control workstation 197 may be operable to record the video signals generated by the video cameras 198.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
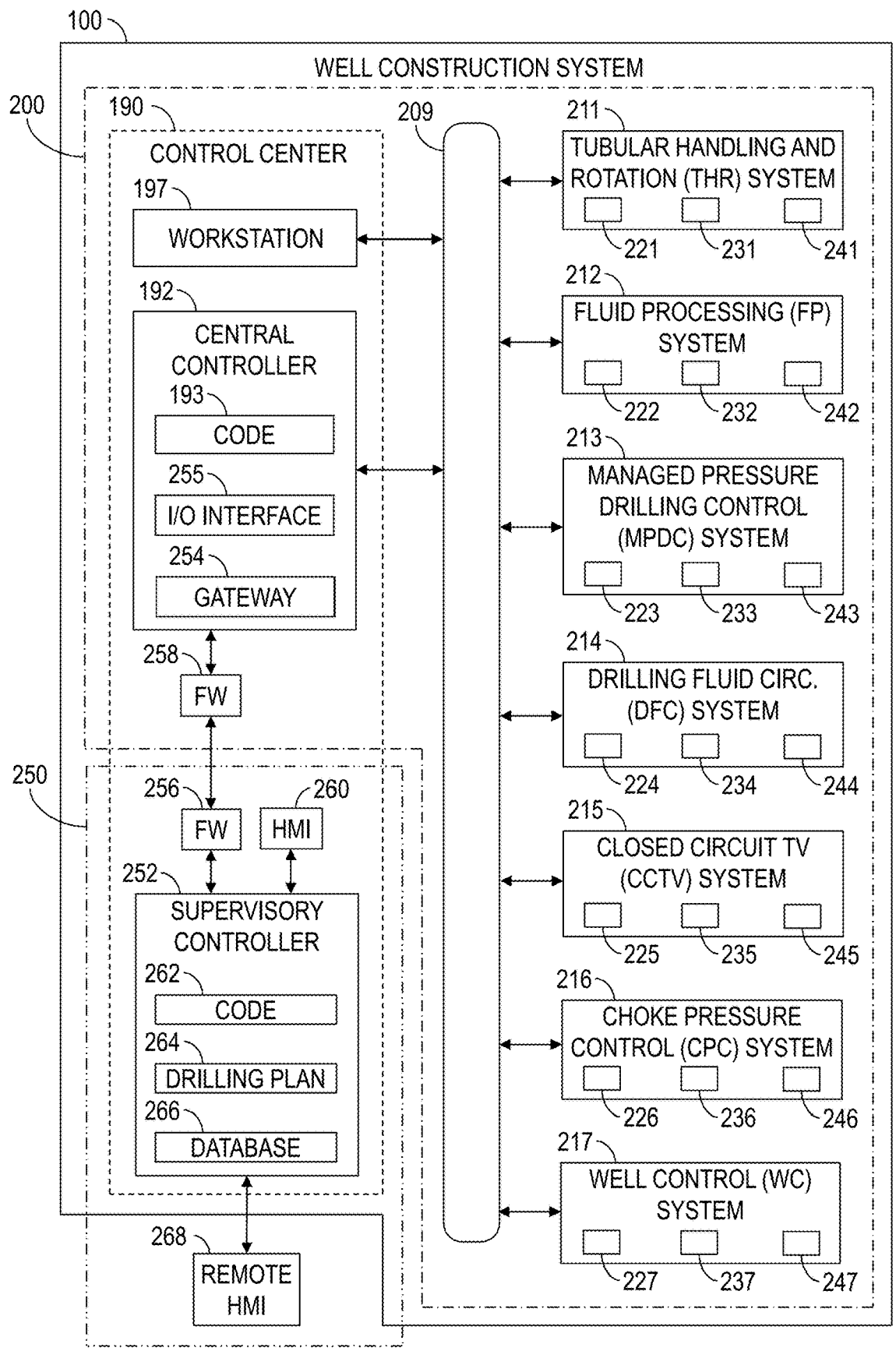
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a drilling rig control system 200 (hereinafter "rig control system") for monitoring and controlling various equipment, portions, and subsystems of the well construction system 100 shown in FIG. 1. The rig control system 200 may comprise one or more features of the well construction system 100, including where indicated by the same reference numbers. Accordingly, the following description refers to FIGS. 1 and 2, collectively.

The various pieces of wellsite equipment (i.e., well construction equipment) described above and shown in FIGS. 1 and 2 may each comprise one or more (e.g., hydraulic and/or electrical) actuators, which when actuated, may cause corresponding components or portions of the piece of wellsite equipment to perform intended actions (e.g., work, tasks, movements, operations, etc.). Each piece of equipment may further comprise a plurality of sensors, whereby one or more sensors may be associated with a corresponding actuator or another component of the piece of equipment and communicatively connected with a corresponding equipment controller. Each sensor may be operable to generate sensor data (e.g., electrical sensor signals or measurements) indicative of an operational (e.g., mechanical, physical) status of the corresponding actuator or component, thereby permitting the operational status of the actuator to be monitored by the equipment controller. The sensor data may be utilized by the equipment controller as feedback data, permitting operational control of the piece of equipment and coordination with other equipment. Such sensor data may be indicative of performance of each individual actuator and, collectively, of the entire piece of wellsite equipment.

The rig control system 200 may be in real-time communication with and utilized to monitor and/or control various portions, components, and equipment of the well construction system 100 described herein. The equipment of the well construction system 100 may be grouped into several subsystems, each operable to perform a corresponding operation and/or a portion of the well construction operations described herein. The subsystems may include a tubular handling and rotation (THR) system 211, a fluid processing (FP) system 212, a managed pressure drilling control (MPDC) system 213, a drilling fluid circulation (DFC) system 214, a closed-circuit television (CCTV) system 215, a choke pressure control (CPC) system 216, and a well pressure control (WC) system 217. The control workstation 197 may be utilized to monitor, configure, control, and/or otherwise operate one or more of the subsystems 211-217.

The THR system 211 may include the support structure 112, a tubular hoisting system (e.g., the drawworks 118, the elevator links 127, the elevator 129, the slips 119), a drill string rotational system (e.g., the top drive 116 and/or the rotary table and kelly), a tubular handling system or equipment (e.g., the catwalk 161, the THM 160, the setback 166, and the iron roughneck 165), electrical generators, and other equipment. Accordingly, the THR system 211 may perform power generation controls and tubular handling, hoisting, and rotation operations. The THR system 211 may also serve as a support platform for drilling equipment and staging ground for rig operations, such as connection make up and break out operations described above. The FP system 212 may include the drilling fluid reconditioning equipment 170, the flare stack 174, the gas sensor 176, the containers 142, 143, and/or other equipment. Accordingly, the FP system 212 may perform fluid cleaning and reconditioning operations. The MPDC system 213 may include the RCD 138, the choke manifold 152, downhole pressure sensors 186, and/or other equipment. The DFC system 214 may comprise the pumps 144, the drilling fluid container 142, the bell nipple 139, and/or other equipment collectively operable to pump and circulate the drilling fluid at the wellsite surface and downhole. The CCTV system 215 may include the video cameras 198, one or more other input devices 194 (e.g., a keyboard, a touchscreen, etc.), one or more video output devices 196 (e.g., video monitors), various communication equipment (e.g., modems, network interface cards, etc.), and/or other equipment. The CCTV system 215 may be utilized to capture real-time video of various portions or subsystems 211-217 of the well construction system 100 and display video signals from the video cameras 198 on the video output devices to display in real-time the various portions or subsystems 211-217 of the well construction system 100. The CPC system 216 may comprise the choke manifold 156, the ported adapter 136, and/or other equipment, and the WC system 217 may comprise the BOP stack 130, the power unit 137, and a BOP control station (e.g., BOP control station 370 shown in FIG. 5) for controlling the power unit 137. Each of the well construction subsystems 211-217 may further comprise various communication equipment (e.g., modems, network interface cards, etc.) and communication conductors (e.g., cables), communicatively connecting the equipment (e.g., sensors and actuators) of each subsystem 211-217 with the control workstation 197 and/or other equipment. Although the wellsite equipment listed above and shown in FIG. 1 is associated with certain wellsite subsystems 211-217, such associations are merely examples that are not intended to limit or prevent such wellsite equipment from being associated with two or more wellsite subsystems 211-217 and/or different wellsite subsystems 211-217.

The rig control system 200 may also include various local controllers 221-227 associated with corresponding subsystems 211-217 and/or individual pieces of equipment of the well construction system 100. As described above, each well construction subsystem 211-217 includes various wellsite equipment comprising corresponding actuators 241-247 for performing operations of the well construction system 100. Each subsystem 211-217 further includes various sensors 231-237 operable to generate sensor measurements or data indicative of operational status of the wellsite equipment of each subsystem 211-217. Each local controller 221-227 may output control data (e.g., commands, signals, information, etc.) to one or more actuators 241-247 to perform corresponding actions of a piece of equipment or subsystem 211-217. Each local controller 221-227 may receive sensor data generated by one or more sensors 231-237 indicative of operational status of an actuator or another portion of a piece of equipment or subsystem 211-217. Although the local controllers 221-227, the sensors 231-237, and the actuators 241-247 are each shown as a single block, it is to be understood that each local controller 221-227, sensor 231-237, and actuator 241-247 may be or comprise a plurality of local controllers, sensors, and actuators.

The sensors 231-237 may include sensors utilized for operation of the various subsystems 211-217 of the well construction system 100. For example, the sensors 231-237 may include cameras, position sensors, pressure sensors, temperature sensors, flow rate sensors, vibration sensors, current sensors, voltage sensors, resistance sensors, gesture detection sensors or devices, voice actuated or recognition devices or sensors, and/or other examples. The sensor data may include signals or information indicative of equipment operation status (e.g., on or off, up or down, set or release, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data was acquired. The sensor data may also or instead be aligned with a depth or other drilling parameter.

The local controllers 221-227, the sensors 231-237, and the actuators 241-247 may be communicatively connected with a central controller 192. For example, the local controllers 221-227 may be in communication with the sensors 231-237 and actuators 241-247 of the corresponding subsystems 211-217 via local communication networks (e.g., field buses) (not shown) and the central controller 192 may be in communication with the subsystems 211-217 via a central communication network 209 (e.g., a data bus, a field bus, a wide-area-network (WAN), a local-area-network (LAN), etc.). The sensor data (e.g., electronic signals, information, and/or measurements, etc.) generated by the sensors 231-237 of the subsystems 211-217 may be made available for use by the central controller 192 and/or the local controllers 221-227. Similarly, control data generated by the central controller 192 and/or the local controllers 221-227 may be automatically communicated to the various actuators 241-247 of the subsystems 211-217, perhaps pursuant to predetermined programming, such as to facilitate well construction operations and/or other operations described herein. Although the central controller 192 is shown as a single device, it is to be understood that the central controller 252 may be or comprise a plurality of devices collectively comprising the structure and mode of operation described herein.

The sensors 231-237 and actuators 241-247 may be monitored and/or controlled by the central controller 192. For example, the central controller 192 may be operable to receive sensor data from the sensors 231-237 of the wellsite subsystems 211-217 in real-time, and to provide real-time control data to the actuators 241-247 of the subsystems 211-217 based on the received sensor data. However, certain operations of the actuators 241-247 may be controlled by the local controllers 221-227, which may control the actuators 241-247 based on sensor data received from the sensors 231-237 and/or based on control data received from the central controller 192.

The rig control system 200 may be a tiered control system, wherein control of the subsystems 211-217 of the well construction system 100 may be provided via a first tier of the local controllers 221-227 and a second tier of the central controller 192. The central controller 192 may facilitate control of one or more of the subsystems 211-217 at the level of each individual subsystem 211-217. For example, in the FP system 212, sensor data may be fed into the local controller 242, which may respond to control the actuators 232. However, for control operations that involve multiple systems, the control may be coordinated through the central controller 192. For example, coordinated control operations may include the control of downhole pressure during tripping. The downhole pressure may be affected by both the DFC system 214 (e.g., pump rate), the MPDC 213 (e.g., choke position of the MPDC), and the THR system 211 (e.g., tripping speed). Thus, when it is intended to maintain certain downhole pressure during tripping, the central controller 192 may be utilized to direct the appropriate control data to two or more (or each) of the participating subsystems.

As described above, the central controller 192 may control various operations of the subsystems 211-217 via analysis of sensor data from one or more of the wellsite subsystems 211-217 to facilitate coordinated control between the subsystems 211-217. The central controller 192 may generate control data to execute control of the subsystems 211-217. The control data may include, for example, commands from rig personnel, such as turn on or off a pump, switch on or off a valve, and update a physical property set-point, among other examples. The central controller 192 may include a fast control loop that directly obtains sensor data and executes, for example, a control algorithm. The central controller 192 may include a slow control loop to generate the control data.

The rig control system 200, including the central controller 192 and the local controllers 221-227, facilitates operation of the well construction equipment in an equipment focused manner, such as to maintain the choke pressure to a certain value or to rotate the drill string at a certain RPM. The rig control system 200 may also coordinate operations of certain pieces of equipment to achieve intended operations, such as to move a tubular from the fingerboard to the well center, break up a tubular stand from the well center, or rack an individual tubular back to the fingerboard. Each such operation utilizes coordinated operation of multiple pieces of pipe handling equipment.

The downhole controller 188, the central controller 192, the local controllers 221-227, and other controllers or processing devices of the well construction system 100 may be operable to receive and store machine-readable and executable program code instructions 193 (e.g., computer program code, algorithms, programmed processes or operations) and/or sensor data from sensors (e.g., sensors 231-237), execute the program code instructions 193, process the sensor data according the program code instructions 193, and generate control data (i.e., control signals or information) to operate controllable equipment (e.g., actuators 241-247) of the well construction system 100. Accordingly, the downhole controller 188, the central controller 192, the local controllers 221-227, and other controllers or processing devices of the well construction system 100 may individually or collectively be referred to hereinafter as equipment controllers. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to store program code instructions, receive sensor data and/or control data, and cause operation of controllable equipment based on such program code instructions, sensor data, and/or control data.

A control workstation 197 may be communicatively connected with the central controller 192 and/or the local controllers 221-227 via the communication network 209 and, thus, operable to receive sensor data from the sensors 231-237 and transmit control data to the central controller 192 and/or the local controllers 221-227 to control the actuators 241-247. Accordingly, the control workstation 197 may be utilized by rig personnel (e.g., a driller) to monitor and control the actuators 241-247 and other portions of the subsystems 211-217 directly and/or indirectly via the central controller 192 and/or local controllers 221-227. The central controller 192 may be located within a control center 190 or at another location.

The present disclosure is further directed to a supervisory control system communicatively connectable with the rig control system of a fully operational well construction rig (i.e., well drilling or construction system) and operable to control selected portions of the well construction rig via the rig control system. The supervisory control system may be installed on or integrated with the well construction rig while the well construction rig is being constructed. The supervisory control system may instead be installed on or integrated with a previously constructed and fully operational well construction rig. The supervisory control system may be configured to communicate with and control a rig control system, including a rig control system that utilizes a communication protocol that is different from the communication protocol utilized by the supervisory control system. Thus, the supervisory control system may be installed on or integrated with well construction rigs constructed by different manufacturers. The supervisory control system may be operable to automate selected operations of the well construction operations of the well construction rig and, thus, cause the selected operations to be performed without manual control of the well construction equipment by rig personnel (e.g., driller) via a rig control workstation. The supervisory control system may be operable to make decisions related to selection of actions or sequences of operations that are to be implemented during the well construction operations and/or the manner (e.g., speed, torque, power, etc.) in which such selected operations are to be implemented. Thus, the supervisory control system may operate as a virtual driller that can make well construction (e.g., drilling) decisions related to how a well is constructed by the well construction rig.

FIG. 2 further shows a schematic view of an example supervisory control system 250 according to one or more aspects of the present disclosure. The supervisory control system 250 may be installable in association with the well construction system 100 and operable to control selected portions of the well construction system 100 via the rig control system 200. The supervisory control system 250 may be communicatively connectable with the central controller 192 to communicatively connect the supervisory control system 250 with the rig control system 200. For example, the supervisory control system 250 may comprise a supervisory controller 252 communicatively connectable with the central controller 192 to communicatively connect the supervisory control system 250 with the rig control system 200. The supervisory controller 252 may be operable to communicate with the central controller 192, and to monitor and automatically control the various equipment (e.g., actuators 241-247) of the subsystems 211-217 via the central controller 192. The supervisory controller 252 may be implemented in a PLC, an IPC, a PC, a soft PLC, and/or other equipment controller or processing devices operable to store program code instructions, receive sensor data and/or control data, and cause operation of controllable equipment based on such program code instructions, sensor data, and/or control data. The supervisory controller 252 may be or comprise a backend server computer communicatively connected with the central controller 192. The supervisory controller 252 may be installed or otherwise located within the control center 190 or at another location of the well construction system 100. Although the supervisory controller 252 is shown as a single device (i.e., a discrete hardware component), it is to be understood that the supervisory controller 252 may be or comprise a plurality of devices collectively comprising the structure and mode of operation described herein.

Communications between the control systems 200, 250 may be guided by principles aimed at ensuring personal safety of rig personnel at the well construction system 100 as well as safety of the well construction equipment and the well. Supervisory control system 250 and the communication interface with the rig control system 200 are configured to be "non-critical" systems over the rig control system 200. Namely, if the supervisory control system 250 goes down, the well construction system 100 may still be operated (e.g., manually controlled) via the rig control system 200. Furthermore, the rig control system 200 has limited knowledge of (e.g., feedback from) the supervisory control system 250. For example, the rig control system 200 receives command data from the supervisory control system 250 that is similar to manual commands from the rig personnel (e.g., driller) using the control workstation 197. Thus, the rig control system 200 is aware of the presence of a "remote-control" supervisory control system 250 without knowing the context of the control commands the control system 200 receives.

The rig control system 200 is still responsible for ensuring safety of personnel and equipment, and can override the supervisory control system 250. Thus, safety at the well construction system 100 is bound by the existing protections of the rig control system 200. Furthermore, individual control commands from the supervisory control system 250 are "complete" and do not "require" a response to be sent to the supervisory control system 250 to be executed. The supervisory control system 250 has communication access and control just over functions of the rig control system 200 utilized to perform current workflows of the supervisory control system 250. The supervisory control system 250 cannot access arbitrary controls available on the different equipment unless explicitly permitted. The rig personnel have to grant explicit authorization from the control workstation 197 for remote control of the supervisory control system 250 to be activated. Furthermore, the supervisory control system 250 is not able to seize control of a piece of well construction equipment without explicit authorization from the rig personnel using the control workstation 197.

Prior to installation of the supervisory control system 250 on a well construction system 100, a listing of supervisory control system authority revoking conditions for revoking (e.g., stopping, ending) automatic control by the supervisory control system 250 has to be agreed upon between IT managers or operators of the supervisory control system 250 and the rig control system 200. For example, authorization will be automatically revoked, canceled, or ended if the rig personnel interact with the control workstation 197 for a piece of well construction equipment that has already been granted automated control authorization (e.g., pulling on a joystick to control the drawworks 118 will revoke control authority of the supervisory control system 250) according to the authorization listing. Furthermore, communication problems detected between the well construction equipment and the supervisory control system 250 will also cause the automated control authorization to be revoked. Each transition of authority between the control systems 200, 250 has to be seamless (i.e., contain no set-point bumps).

The supervisory control system 250 and the rig control system 200 may communicate via a communication interface between the supervisory control system 250 and the rig control system 200. The communication interface may include a communication gateway 254 and an input/output (I/O) interface 255. The communication interface may be implemented via the central controller 192 of the rig control system 200 or another processing device communicatively connected with the central controller 192. Specifications or set-points for the communication gateway 254 and the I/O interface 255 may be programmed or otherwise implemented as part of the central controller 192 before or during installation of the supervisory control system 250 in association with the well construction system 100. Because the communication gateway 254 and the I/O interface 255 are ran, executed, or otherwise operated on or by the central controller 192 of the rig control system 200, the communication gateway 254 and the I/O interface 255 may be considered part of the rig control system 200. Through the communication gateway 254, the supervisory control system 250 may gain, acquire, or otherwise have access to programmatically control one or more coordinated control functions that are available (e.g., saved, programmed) in the central controller 192 and/or one or more control functions that are available in the control workstation 197.

The rig control system 200 and the supervisory control system 250 may communicate via or otherwise utilize different communication protocols. Accordingly, the supervisory control system 250 may be communicatively connected with the rig control system 200 via the communication gateway 254 (e.g., network gateway, protocol translation gateway) to the rig control system 200. The communication gateway 254 may be operable to translate or otherwise convert signals or information communicated (i.e., exchanged) between the supervisory control system 250 and the rig control system 200 to corresponding communication protocols to permit the supervisory control system 250 and the rig control system 200 to communicate with each other. To facilitate such communication gateway 254, the central controller 192 may run (e.g., operate, execute) or otherwise comprise a protocol translator or another application operable to perform protocol conversions to connect the supervisory control system 250 and the rig control system 200, each using a different network protocol technology. The communication gateway 254 may communicatively connect the supervisory controller 252 with the central controller 192. The communication gateway 254 may, thus, be operable to facilitate (e.g., translate) communications exchanged between the supervisory controller 252 and the central controller 192. For example, the communication gateway 254 may be operable to receive first information using a first communication protocol from the supervisory controller 252, transmit the first information using a second communication protocol to the central controller 192, receive second information using the second communication protocol from the central controller 192, and transmit the second information using the first communication protocol to the supervisory controller 252. The communication protocol utilized by the supervisory control system 250 may be, for example, OPC-UA and the communication protocol utilized by the rig control system 200 may be, for example, UDP or other fieldbus protocols.

The communication gateway 254 may be operable to translate message-based commands from the supervisory control system 250 to a memory mapped I/O in the communication protocol of the rig control system 200 without adding control specific logic. The communication gateway 254 may just permit commands for control that are specifically defined, ensuring that no unintended commands are sent the rig control system 200. The central controller 192 may comprise two distinct network interfaces, namely, a dedicated connection to the supervisory controller 252 and a dedicated connection to the rig control system 200.

The supervisory control system 250 may communicate with the rig control system 200 via the communication gateway 254, wherein the supervisory controller 252 is the client and the communication gateway 254 hosts the server (i.e., the central controller 192) to provide communication protocol connectivity (e.g., on port 4840). OPC-UA is a client/server communication technology that is platform independent, provides data modeling capabilities, and supports PLC automation environment. The communication gateway 254 may utilize data access capabilities of the OPC-UA protocol to exchange specific I/O with the PLCs of the rig control system 200.

The control systems 200, 250 may be communicatively connected one-to-one. Furthermore, confidentiality and integrity of communications between the control systems 200, 250 may be protected using encryption and hash, such as those provided by the OPC-UA security profile Basic256SHA256. The control systems 200, 250 may obtain trust based on the trust-on-first-use (TOFU) model with pinned self-signed certificates. The TOFU implementation mandates that upon making an initial request to the server (i.e., the communication gateway 254) for the first time, the client (i.e., the supervisory controller 252) submits an X509 certificate (token) that has to be manually validated in order to verify future connections to the server. Additionally, the server may submit an X509 certificate to the client for manual validation and verification in order to verify server side communications for future interactions. It should be recognized that under this model, human interaction is mandated to manually validate the requesting client before or during installation of the supervisory control system 250. Although this does tend to increase chances of human error, it provides a high level of security considering rig personnel have to initiate process and perform a sequence of checks to complete the process of verifying future interaction with the client.

The TOFU implementation utilizes a self-signed X509 certificate submitted by the client as a token for authorization and identity verification. This means that the certificate presented by the client is assumed to be issued and signed by the same entity whose identity it certifies. With respect to communications between the control systems 200, 250, there is no certificate authority and, thus, no public key used to verify authenticity of the certificate. The self-signed certificate presented to the server from the client and attached to the request is not promoted to a trusted location in the certificate store, but instead is recorded as "pinned" using the submitted certificate's unique thumbprint. After an IT technician receives and verifies the certificate's thumbprint, it is submitted to the server data store and kept on record until manually removed at a later date. Just one certificate thumbprint is permitted per server instance, thus, preventing future requests from a different client certificate.

In addition to the client certificate, which is used to identify and authorize the client, a self-signed server certificate may be created for the server side. This certificate is used to bind to the communication port used to secure and encrypt the traffic over TCP between server and the client. This certificate is available to the client and can be used to replicate the pinning process used on the server by the automation client. This permits the server certificate to be manually verified and pinned for use by the automation client using a similar approach as that implemented by the server and described above. If there is a change in the client or server certificate or if there is an expiration of the client or server certificate, then an IT technician has to make changes manually to validate new certificates for the communication. This would mandate intervention on-site at the well construction system 100. Remote access to the server may not be permitted and will mandate an IT technician to be dispatched on-site.

The central controller 192 may further operate as or run an I/O interface 255 defining input and output signals, and expected behaviors or operations that are implemented by programs (e.g., PLC programs) of each actuator of the well construction equipment. The I/O interface 255 may be further operable to permit seamless transition between local and remote control (i.e., set-points cannot fluctuate). The I/O interface 255 may be implemented over a predetermined communication protocol, such as OPC-UA.

The I/O interface 255 may define signals and behaviors between the supervisory control system 250 and the various equipment controllers (e.g., local controllers 221-227) of the well construction equipment that will have to be configured or established to communicatively connect the supervisory control system 250 with the individual equipment controllers of the rig control system 200. For example, the I/O interface 255 may be operable to permit transition "message based" control data (i.e., control commands) to a flat memory mapped structure utilized by the equipment controllers (e.g., PLCs). The message based control data may be specified (i.e., mapped) to communication protocol (e.g., OPC-UA) methods linked to equipment controller function blocks. Namely, each communication output from the supervisory control system 250 and communication input to the supervisory control system 250 may be matched with a corresponding input and output of and, thus, function performed by a piece of well construction equipment. Each output and input of the supervisory controller 252 may, thus, be matched with a corresponding input and output of the equipment controller (e.g., local controller 221-227) associated with the piece of well construction equipment. The specifications for the I/O interface 255 may be provided through a communication protocol (e.g., OPC-UA) extensible markup language (XML) model, which permits IT technicians (e.g., PLC developers, computer code programmers) with appropriate tools (e.g., Siome for Siemens) to map a data model to equipment controller variables/methods.

The I/O interface 255 may comprise or utilize a process for an equipment controller to detect new incoming commands without confusing them with initial values, a process to check authorization before handing control, and a process to check on the health of the supervisory control system 250 to recognize whether it is safe to remain in under automated control of the supervisory control system 250. New commands coming into the rig control system 200 may be tracked and distinguished from old set-points or uninitialized data. For example, a control command may be mapped to a supervisory control system protocol method and each parameter may be sent along the call.

The supervisory control system protocol process may be linked to an equipment controller function block, which may receive the parameters, validate the parameters, and send a reply to the rig control system 252 that the equipment controller is starting to execute the control command. That way, the control command is not blocking (e.g., the rig control system 252 does not have to wait for a block movement to complete before sending the next control command). The communication gateway 254 may keep the active parameters and a "command active" flag may be activated, such that the supervisory control system 250 can check the operational status of the control system 200. If a new control command arrives while the previous action is being executed, the previous operation may be cancelled, and the new control command may take effect with the new parameters. Control commands and statuses flowing through the I/O interface 255 may be transmitted via an industrial fieldbus (e.g., the control network 209) running at a fixed cycle time. The maximum rate at which the control commands (i.e., inputs) are accepted from the supervisory control system 250 may be slower than the fieldbus cycle time. Control commands sent faster than the maximum rate may be dropped in the I/O interface 255. For statuses, performance of the I/O interface 255 may be close to the performance of the fieldbus cycle time.

A communication health check may be ran to determine health of communications between the control systems 200, 250. For example, a two-way heartbeat may be used to ensure that both the rig control system 200 and the supervisory control system 250 can detect communication failure or unresponsiveness of their counterpart and take appropriate measure to ensure safety of the control systems 200, 250. First, each equipment controller of the rig control system 200 may implement an incrementing rolling heartbeat (e.g., a 16-bit signed integer rolling at 0x7FFF) to be sent to the supervisory control system 250. This heartbeat may be updated and sent at the fastest cycle time available over the gateway 254. Second, the supervisory control system 250 may implement an incrementing rolling heartbeat (e.g., a 16-bit signed integer rolling at 0x7FFF) to be sent to each equipment controller of the rig control system 200. This heartbeat may be updated and sent at a predetermined frequency, such as based on how fast a communication outage is to be detected. Each control system 200, 250 may monitor the heartbeats to determine whether the connection is alive on each cycle. For example, if three cycles are missed, then the connection may be assumed to be down. The control systems 200, 250 may then revoke control authority of the supervisory control system 250 if the connection is treated as being down.

In addition to or instead of the heartbeat, both the supervisory control system 250 and each equipment controller may set a boolean "ready" flag to "true," thereby signaling that the supervisory control system 250 is ready to take control and that the equipment controllers are ready to be controlled. The ready flag serves a similar purpose to the heartbeat. Namely, the ready flag is used as a check that the control systems 200, 250 are both healthy. However, the ready flag permits a quicker response in case of communication issues, where typically I/O defaults to zeros on an equipment controller.

An echo functionality may be implemented to measure data round-trip time between the supervisory control system 250 and an equipment controller. The round-trip time may be used for statistical measurement of the actual data latency in the system. It will be an input for control system engineers to consider when designing automated control applications. The system heartbeat may serve as the "echo in" parameter to the equipment controller, and will be sent back as an "echo out" from the equipment controller.

Internal communications between various components (e.g., networking equipment, well construction equipment, sensors, controllers, input devices, output devices, etc.) of the rig control system 200 may be unsecured. Thus, communication traffic between the supervisory control system 250 and the rig control system 200 may be secured against malicious attack and controlled. Thus, the control systems 200, 250 may have one or more firewalls between them controlling traffic therebetween.

Communication traffic between the supervisory control system 250 and the rig control system 200 may be secured against malicious attack and controlled via a communication firewall 256. The communication firewall 256 may be communicatively connected between the supervisory controller 252 and the central controller 192. The firewall 256 may be managed or administered by an IT technician (e.g., supplier, vendor) of the supervisory control system 250. Another firewall 258 may be communicatively connected between the firewall 256 and the central controller 192 to provide another layer of security and/or to further control information traffic entering and leaving the rig control system 200. The firewall 258 may be managed or administered by an IT technician (e.g., operator, owner) of the well construction system 200.

The supervisory control system 250 may further comprise an HMI 260 usable by the rig personnel to monitor and control the supervisory control system 250 to monitor and control the well construction equipment of the well construction system 100. The HMI 260 may be communicatively connected with the supervisory controller 252 and operable for entering or otherwise communicating control data to the supervisory controller 252 by the rig personnel (e.g., the driller) for controlling the supervisory control system 250 and the well construction equipment of the well construction system 100. The HMI 260 may be further operable for displaying or otherwise communicating sensor data and other information from the supervisory controller 252 to the rig personnel, thereby permitting the rig personnel to monitor the supervisory control system 250 and the well construction equipment of the well construction system 100. For example, the HMI 260 may be operable to display to the rig personnel the current operational status of the well construction equipment. The HMI 260 may be or comprise a control workstation, a terminal, a computer, or another device comprising one or more input devices (e.g., a keyboard, a mouse, a joystick, a touchscreen, etc.) and one or more output devices (e.g., a video monitor, a touchscreen, a printer, audio speakers, etc.). The HMI 260 may be physically installable in association with the control workstation 197 of the well construction system 100, such as may permit the rig personnel (e.g., the driller) using the control workstation 197 to also use the HMI 260. Communication between the HMI 260 and the supervisory controller 252 may be via wired and/or wireless communication means. However, for clarity and ease of understanding, such communication means are not depicted, and a person having ordinary skill in the art will appreciate that such communication means are within the scope of the present disclosure.

The supervisory controller 252 may further comprise a memory device (e.g., a memory chip) operable to receive and store machine-readable and executable program code instructions 262 (e.g., computer program code, algorithms, programmed processes or operations), which when executed, may cause the supervisory controller 252 to cause, facilitate, or otherwise implement one or more aspects of methods and operations described herein. For example, the program code instructions 262, when executed, may cause the supervisory controller 252 to perform monitoring and control processes or operations described herein, including monitoring and controlling well construction operations. The program code instructions 262 may comprise rules (e.g., algorithms) based upon the laws of physics for drilling operations.

The supervisory control system 250 may further comprise a memory device operable to receive and store a well construction plan 264 (e.g., drilling plan) for drilling and/or otherwise constructing a planned well. The well construction plan 264 may include specifications, parameters, schedules, and other information indicative of the planned well and the well construction equipment of the well construction system 100. For example, the well construction plan 264 may include properties of the subterranean formation through which the planned well is to be drilled, the path (e.g., direction, curvature, orientation) along which the planned well is to be drilled through the formation, the depth (e.g., true vertical depth (TVD), measured depth (MD)) of the planned well, specifications (e.g., power output, weight, torque capabilities, speed capabilities, dimensions, size, etc.) of the well construction equipment (e.g., top drive, mud pumps, 144, downhole mud motor 184, etc.) to be used to construct the planned well, and/or specifications (e.g., diameter, length, weight, etc.) of tubulars (e.g., drill pipe) to be used to construct the planned well. The well construction plan 264 may be a digital well construction plan comprising information that can be executed or analyzed programmatically by the program code instructions 262 without human intervention. The memory device storing the well construction plan 264 may be or form a portion of the supervisory controller 252 or the memory device storing the well construction plan 264 may be communicatively connected with the supervisory controller 252. The program code instructions 262, when executed, may analyze the well construction plan 264 and generate or output control data to the central controller 192 to control the well construction equipment to cause, facilitate, or otherwise implement one or more aspects of methods and operations described herein.

The well construction plan 264 may further comprise a plurality of well construction tasks (i.e., well construction objectives) that are intended to be achieved to complete the well construction plan 264. Each well construction task may comprise a plurality of operational sequences and may be performed by the well construction equipment to construct the planned well. A well construction task may be or comprise drilling a predetermined portion or depth of the planned well, completing a predetermined portion or stage of drilling operations, drilling through a predetermined section of the subterranean formation, and performing a predetermined plurality of operational sequences, among other examples. Each operational sequence may comprise a plurality or sequence of physical (i.e., mechanical) operations (i.e., actions) performed by various pieces of well construction equipment. Example operational sequences may include operations of one or more pieces of the well construction equipment of the well construction system 100 described above in association with FIG. 1.

The supervisory control system 250 may further comprise a memory device operable to receive and store a database 266 (e.g., a library) of operational sequences that may be performed by the well construction equipment. Each operational sequence may comprise a plurality or series of physical or mechanical operations (e.g., actions, movements) that may be performed by one or more pieces of the well construction equipment. Each operational sequence may be performed by corresponding pieces of the well construction equipment to perform a corresponding portion of the well construction operations (e.g., to drill a corresponding stage of the planned well). The database 266 may store operational sequences for performing each planned well construction task of the well construction plan 264. The database 266 may store a plurality of alternate operational sequences associated with (i.e., for performing) a well construction task or a procedure (e.g., a portion of a well construction task comprising a plurality of mechanical operations) to be performed by the well construction equipment. Thus, each well construction task or procedure may be associated with a plurality of different and/or alternate operational sequences for performing such well construction task or procedure. Thus, each operational sequence associated with a selected planned well construction task may comprise a different plurality of actions or movements to be performed by the well construction equipment to perform the selected planned well construction task or procedure. The memory device storing the database 266 may be or form a portion of the supervisory controller 252. For example, the database 266 may be stored on a memory device (e.g., a memory chip) of the supervisory controller 252 that is different from the memory device on which the executable program code instructions 262 are stored. The database 266 may also or instead be stored on the same memory device that stores the executable program code instructions 262. The database 266 may also or instead be stored on a memory device external from the supervisory controller 252 communicatively connected with the supervisory controller 252.

The executable program code instructions 262 (i.e., the monitoring and control process) of the supervisory controller 252, when executed, may be operable to select from the database 266 an operational sequence to be performed by the well construction equipment based on the operational status (e.g., sensor data) of the well construction equipment and the well construction plan 264 input into the supervisory controller 252. For example, before or while a selected (e.g., next in order) planned well construction task of the well construction plan 264 is performed by the well construction equipment, the executable program code instructions 262 may be operable to select from the database 266 an operational sequence to be performed by the well construction equipment to perform the selected planned well construction task based on the operational status of the well construction equipment and the well construction plan 264. The supervisory controller 252 may thus control the well construction equipment via the rig control system 200 (e.g., the central controller 192) to cause the well construction equipment to perform the selected operational sequence. The supervisory controller 252 may cause the well construction equipment to automatically perform the selected operational sequence to perform the selected planned well construction task without manual control of the well construction equipment by the rig personnel via the control workstation 197. For example, when the selected planned well construction task comprises drilling a selected portion of the planned well, the executable program code instructions 262 may be operable to select from the database 266 the operational sequence to be performed by the well construction equipment based on the well construction plan 264, which may comprise specifications of the well construction equipment, properties of a subterranean formation through which the selected portion of the planned well is to be drilled, and a path along which the selected portion of the planned well is to be drilled through the formation 106. During well construction operations, while each planned well construction task is being performed, the supervisory controller 252 may continuously receive via the central controller 192 sensor data from the various sensors 231-237 associated with the well construction equipment and continuously select from the database 266 an optimal one of the operational sequences to be performed by the well construction equipment based on the program code instructions 262, the well construction plan 264, and the sensor data.

Even though the supervisory controller 252 may have access to individually control one or more pieces of wellsite equipment, as well as one or more coordinated control functions in the central controller 192, the supervisory control system 250 may be operated to control the wellsite equipment based on the well construction tasks (i.e., well construction objectives). As described above, the well construction tasks may be defined or provided as part of or in the well construction plan 264 and caused to be performed by the supervisory control system 250. However, the well construction tasks may also or instead be generated or outputted by the supervisory controller 252 at least partially based on the executable program code instructions 262, the well construction plan 264, the database 266, and the coordinated control functions in the central controller 192. For example, the executable program code instructions 262, when executed, may analyze the well construction plan 264 and generate or output a plurality of well construction tasks to achieve the well construction plan 264. Each well construction task may comprise a portion of the well construction plan 264 and be based on capabilities (i.e., specifications) of the well construction equipment and the capabilities of the available operational sequences in the database 266 and/or the coordinated control functions in the central controller 192. Well construction tasks may include, for example, drilling from depth A to depth B, drilling to a total depth on a particular well section, and tripping out the whole drill string.

Each well construction task may include a number of equipment operational sequences, as well as corresponding equipment operating parameters. Each equipment operational sequence, with its corresponding equipment operating parameters, may be sent as control commands from the supervisory controller 252 of the supervisory control system 250 to the central controller 192 of the rig control system 200. The central controller 192 receives the commands and may programmatically execute the equipment operational sequences to achieve the corresponding well construction tasks without intervention by rig personnel. The supervisory controller 252 may further include software tools (e.g., as part of the executable program code instructions 262) operable to detect and/or analyze well construction events, to modify a well construction task, or to re-plan an equipment operational sequence based on sensor data received from the rig control system 200 (e.g., sensors 231-237). Based on the detection and/or analysis of the well construction events, the supervisory controller 252 may send one or more commands to the central controller 192 to, for example, abort the current operation sequences, change operation parameters of the current operation sequence, or initiate a different operation sequence.

The program code instructions 262, when executed, may cause the supervisory controller 252 to perform monitoring and control processes or operations described herein. For example, the supervisory controller 252 may receive sensor data generated by the sensors 231-237 to monitor well construction operations, and output control data to the various actuators 241-247 to control the well construction operations. As described herein, the supervisory controller 252 may be further operable to select an operational sequence to be performed by the well construction equipment based on operational status of the well construction equipment and on the well construction plan 264, and control the well construction equipment via the rig control system 200 to cause the well construction equipment to perform the selected operational sequence without manual control of the well construction equipment by the rig personnel via the control workstation 197.

During monitoring and control operations, the supervisory controller 252 may be further operable to detect well construction events (e.g., drilling events) based on the sensor data, and re-plan well construction tasks, operational sequences, and other processes based on the detected well construction events or otherwise based on condition of the well and well construction equipment. A well construction event may be or comprise an abnormal well construction event, which may include an abnormal equipment event or an abnormal well event. For example, an occurrence of stick slip or lateral vibrations of the drill string may be considered an abnormal equipment event, and an occurrence of wellbore fluid gain or loss may be considered an abnormal well event. For each well construction event, one or more operational sequences may be defined in association with corresponding priority and/or decision making steps, and saved in the database 266 and/or as part of the program code instructions 262. The program code instructions 262 may then automatically select one or more of the most responsive or optimal operational sequences based on parameters (e.g., type, severity, duration of time, etc.) the well construction event. Thus, the supervisory controller 252 may be further operable to stop performance of a previously selected operational sequence when a well construction event is detected, select a different operational sequence based on the detected well construction event to be performed by the well construction equipment to perform a selected planned task, and control the well construction equipment via the rig control system 200 to cause the well construction equipment to automatically perform the selected different operational sequence to perform the selected planned task without manual control of the well construction equipment by the rig personnel via the control workstation 197.

Figure 3:
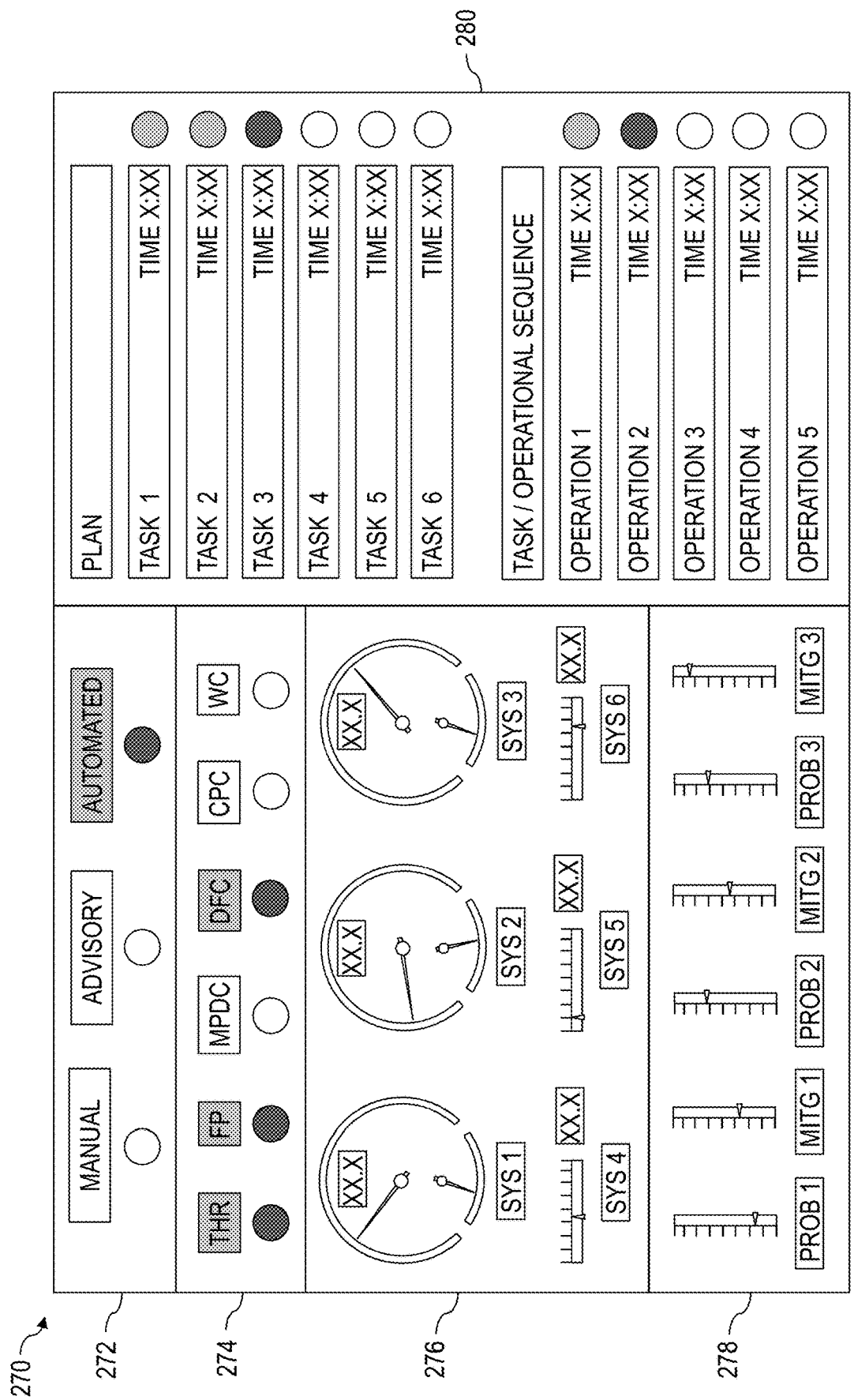
FIG. 3 is an example implementation of a screen displayed by the apparatus shown in FIG. 2 according to one or more aspects of the present disclosure.

During well construction operations, the HMI 260 may be usable by the rig personnel to monitor and control the supervisory control system 250 to monitor and control the well construction equipment of the well construction system 100. FIG. 3 is an example implementation of a display screen 270 that may be displayed by the HMI 260 according to one or more aspects of the present disclosure. The following description refers to FIGS. 1-3, collectively.

The display screen 270 may comprise a control mode selection and confirmation area or window 272, which may be utilized by the rig personnel to select the mode of operation of the supervisory control system 250 and to visually confirm in which mode of operation the supervisory control system 250 is operating. For example, the supervisory control system 250 may be operated in a manual mode, in which the supervisory control system 250 (i.e., the supervisory controller 252) receives sensor data and other information from the rig control system 200, but does not automate or otherwise control the well construction equipment via the rig control system 200. The supervisory control system 250 may be further operable in an advisory mode, in which the supervisory controller 252 receives sensor data and other information from the rig control system 200, but does not automate or otherwise control the well construction equipment via the rig control system 200. While in the advisory mode, the supervisory controller 252 may display to the rig personnel via the HMI 260 information indicative of successive well construction tasks of the well construction plan and/or successive mechanical operations of a well construction task or a selected operational sequence, thereby permitting the rig personnel to use the control workstation 197 to cause the well construction equipment to perform the mechanical operations of the well construction task or selected operational sequence. The supervisory control system 250 may be operable in an automated mode in which the supervisory controller 252 controls the well construction equipment via the rig control system 200 to cause the well construction equipment to automatically perform the mechanical operations of the well construction task or selected operational sequence.

The window 272 may comprise a plurality of virtual or software buttons containing a description (e.g., text, icons, graphics, etc.) of the modes of operation of the supervisory control system 250. One of the buttons may be operated (e.g., touched, clicked on, etc.) by the rig personnel to select the mode of operation the supervisory control system 250 is to operate in. The button associated with the selected or otherwise current mode of operation of the supervisory control system 250 may appear or become lit, highlighted, or otherwise marked to indicate to the rig personnel in which mode of operation the supervisory control system 250 is operating. The window 272 may further include a plurality of virtual or software indicators (e.g., lights), each associated with a corresponding button listing the modes of operation of the supervisory control system 250. One of the indicators may activate (e.g., light up, change color, etc.) to visually confirm or otherwise indicate to the rig personnel which mode of operation the supervisory control system 250 is operating in.

While in the automated mode, the rig personnel may select which well construction equipment may be operated automatically by the supervisory control system 250 and which well construction equipment may be operated manually. Thus, the display screen 270 may comprise a supervisory control selection and confirmation area or window 274, which may be utilized by the rig personnel to select which of the well construction equipment are to be controlled by the supervisory control system 250 and to visually indicate which of the well construction equipment are currently controlled by the supervisory control system 250.

The window 274 may comprise a plurality of virtual or software buttons containing a description (e.g., text, icons, graphics, etc.) of the well construction equipment (e.g., well construction subsystems) of the well construction system 100. One or more of the buttons may be operated by the rig personnel to select which well construction equipment may be controlled by the supervisory control system 250 while in the automated mode of operation. The button associated with the selected well construction equipment may appear or become lit, highlighted, or otherwise marked to indicate to the rig personnel which well construction equipment is automated by the supervisory control system 250. The window 274 may further include a plurality of virtual or software indicators (e.g., lights), each associated with a corresponding button listing the well construction equipment. One or more of the indicators may activate to visually confirm or otherwise indicate to the rig personnel which well construction equipment is automated by the supervisory control system 250.

Although the display screen 270 is shown displaying the control mode selection and confirmation window 272 and the supervisory control selection and confirmation window 274, it is to be understood that the windows 272, 274 may also or instead be displayed on an HMI screen or a video output device of the control workstation 197. The windows 272, 274 may be displayed on the control workstation 197 for safety reasons, permitting just the rig personnel (i.e., the driller) using the workstation 197 to permit the supervisory control system 250 to take control of the well construction equipment via the rig control system 200. For example, the virtual or software buttons of the windows 272, 274 may be displayed on the HMI screen or video output device of the control workstation 197 to permit the rig personnel using the workstation 197 to select the mode of operation of the supervisory control system 250 and the equipment which the supervisory control system 250 controls. However, the virtual or software indicators of the windows 272, 274 may be displayed on the local and remote HMIs 260, 268 to permit the rig personnel using the workstation 197 and/or other personnel not using the workstation 197 to view the mode of operation of the supervisory control system 250 and the equipment which the supervisory control system 250 controls.

The display screen 270 may further comprise an operational status area or window 276, displaying selected sensor signals or information indicative of operational status of selected well construction systems, subsystems, or individual pieces of equipment. The operational status window 276 may display information, such as hook load, weight-on-bit, travelling block position, roughneck torque, trip tank accumulation or volume, return flow rate, drill bit depth, wellbore depth, number of stands or tubulars in the wellbore, standpipe pressure, top drive dolly location, top drive pipe connection status, elevator status, stick-up connection status, and slips status, among other examples. The information displayed in the operational status window 276 may change during the well construction operations while different pieces of equipment are operated. The information in the operational status window 276 may be displayed in the form of actual numerical values, tables, graphs, bars, gauges, lights, and/or schematics, among other examples.

The display screen 270 may further comprise an operational problem and mitigation area or window 278, displaying selected sensor signals or information indicative of operational problems (e.g., stick slip, lateral vibrations, excessive pressure, etc.) associated with the well construction systems, subsystems, or individual pieces of equipment. The operational problem window 278 may display information (e.g., text) indicative of the type of operational problem and information (e.g., bars, graphs, numerical values, etc.) indicative of the magnitude of the operational problem. The operational problem window 278 may also display information (e.g., text) indicative of the type of corrective (e.g., mitigation, counteractive) actions that are being utilized by the supervisory control system 250 to mitigate the associated problem and information (e.g., bars, graphs, numerical values, etc.) indicative of the magnitude of the corrective actions being utilized. The supervisory control system 250 may automatically implement the corrective action, or cause the corrective action to be automatically implemented, such as by implementing one or more predetermined operational sequences while controlling the well construction equipment experiencing the problem.

The supervisory controller 252 may also display to the rig personnel via the HMI 260 information indicative of the planned well construction task and/or operational sequence that is being performed by the well construction equipment. The HMI 260 may also or instead display information indicative of the planned well construction tasks and/or operational sequences that are planned to be performed in the future. The HMI 260 may also or instead display information indicative of specific mechanical operations that are being performed by the well construction equipment or that are planned to be performed in the future.

Thus, the display screen 270 may further comprise a well construction plan area or window 280, displaying a list or descriptions of well construction tasks of a well construction plan and/or a list or descriptions of individual mechanical operations of a selected or current well construction task of the well construction plan. The well construction plan window 280 may also or instead display a list or descriptions of individual mechanical operations of an operational sequence selected by the supervisory control system 250 to implement a well construction task or another portion of the well construction plan. For example, the well construction plan window 280 may display general and/or detailed description of mechanical operations (e.g., work or activities) that were, are, or will be performed by the supervisory control system 250 while in the automated mode or by the rig personnel while in the advisory mode.

The description area 720 may display proactive information regarding the work and/or call-to-actions guiding future work and/or a list of operational steps or actions to be implemented by the rig personnel during the corresponding well construction task. However, the supervisory control system 250 may automatically operate the well construction equipment or subsystem to automatically implement such steps or actions while in the automated mode. The description of work may include a title or name of the well construction task (e.g., project stage or phase) and an estimated date and/or time for completing the well construction task or operation. The window 280 may further include a plurality of virtual or software indicators (e.g., lights), each associated with a corresponding well construction task or operation. One or more of the indicators may activate to visually confirm or otherwise indicate to the rig personnel which well construction task and/or operation of the well construction plan was performed and/or is being performed.

The supervisory control system 250 may comprise or otherwise be utilized in conjunction with one or more remote (i.e., offsite) HMIs 268 or other user devices. The remote HMI 268 may be or comprise a desktop computer, a laptop computer, a smartphone and/or other portable smart device, a PDA, a tablet/touchscreen computer, a wearable computer, and/or other devices. The remote HMI 268 may be communicatively connected with the supervisory controller 252 via a network (e.g., the internet, wide area network (WAN), a cellular network, a satellite network, etc.). The remote HMI 268 may be operable to receive and/or transmit information (e.g., for monitoring functionality) from and/or to the supervisory controller 252. The remote HMI 268 may display the same information in the same manner as described above with respect to the HMI 260, such as via the display screen 270. The remote HMI 268 may be utilized for monitoring operations of the supervisory control system 250 and the rig control system 200. The remote HMI 268 may have limited input functionality, having the ability to request certain information. However, the remote HMI 268 may not be used to control the well construction equipment via the central controller 192.

Figure 4:
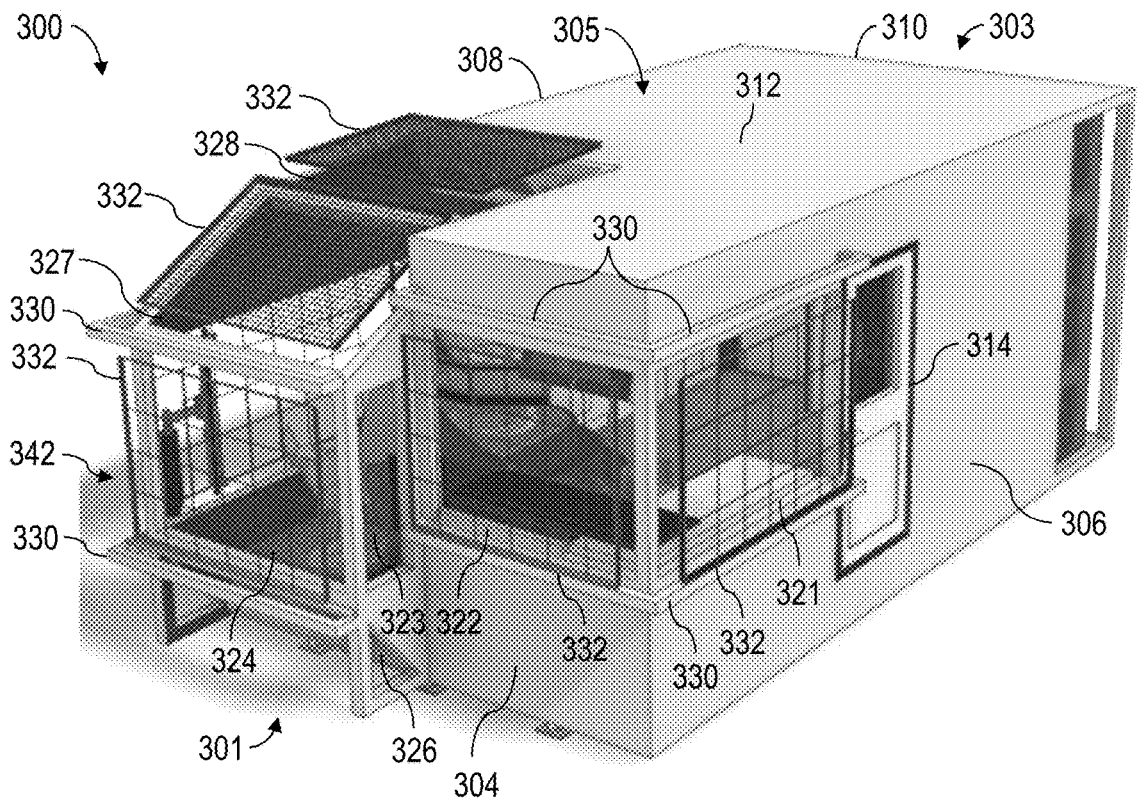
FIG. 4 is a perspective view of at least a portion of an example implementation of apparatus according to one or more aspects of the present disclosure.
Figure 5:
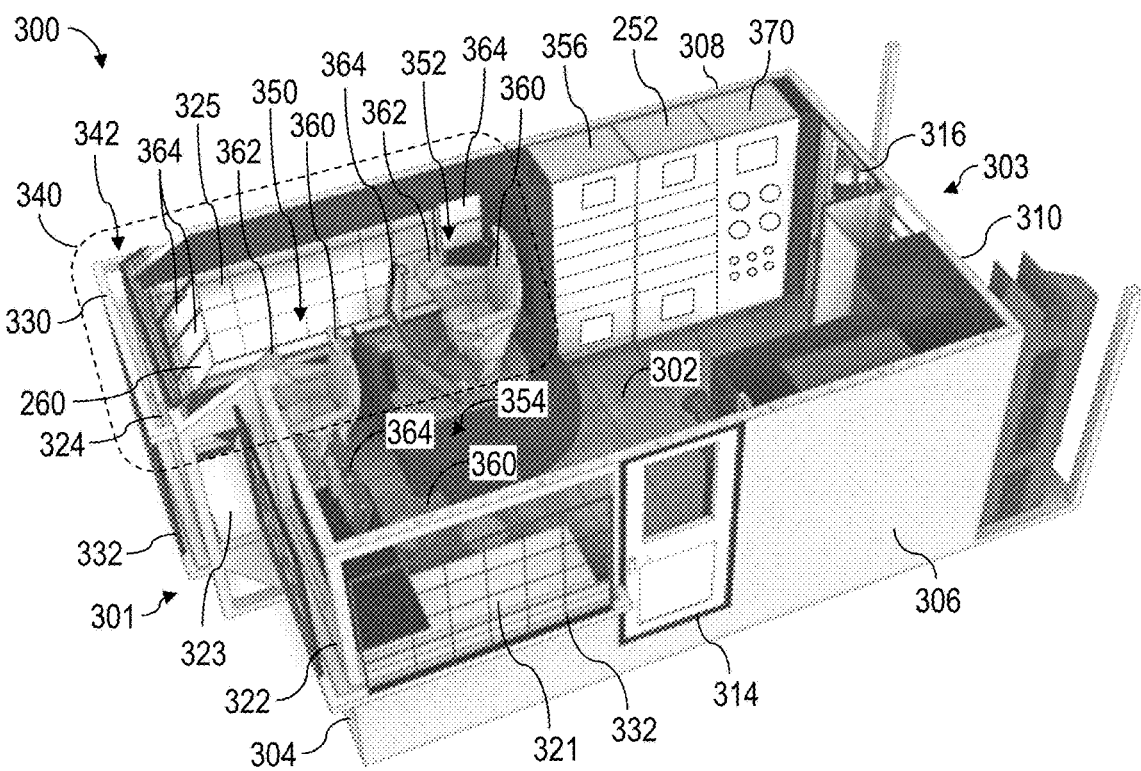
FIG. 5 is a perspective sectional view of the apparatus shown in FIG. 4 according to one or more aspects of the present disclosure.

FIGS. 4 and 5 are perspective and sectional views of at least a portion of an example implementation of a control center 300 according to one or more aspects of the present disclosure. The control center 300 may be an example implementation and comprise one or more features of the control center 190 shown in FIGS. 1 and 2, and utilized to monitor and control one or more portions of the well construction system 100 shown in FIGS. 1 and 2. Accordingly, the following description refers to FIGS. 1, 2, 4, and 5, collectively.

The control center 300 comprises a facility 305 (e.g., a room, a cabin, a trailer, etc.) containing various control devices for monitoring and controlling the subsystems 211-217 and other portions of the well construction system 100. The facility 305 may comprise a front side 301, which may be directed toward or located closest to the drill string 120 being constructed by the well construction system 100 and a rear side 303, which may be directed away from the drill string 120. The facility 305 may comprise a floor 302, a front wall 304, a left wall 306, a right wall 308, a rear wall 310, and a roof 312. The facility 305 may also have a side door 314, a rear door 316, and a plurality of windows 321-328 in one or more of the walls 304, 306, 308, 310 and/or the roof 312. Each of the windows 321-328 may be surrounded by structural framing 330 connected with the walls and supporting window safety guards 332 (e.g., bars, grills) in front of or along the windows 321-328.

The facility 305 may have an observation area 340 at the front side 301 of the facility 305 from which rig personnel will have an optimal or otherwise improved view of the drill string 120, the rig floor 114, and/or other portions of the well construction system 100. The observation area 340 may be surrounded or defined by windows 323-328 on several sides to increase horizontal and vertical angle of view of the well constriction system 100. A portion 342 of the observation area 340 (e.g., windows 323-327) may protrude or extend out past other portions of the facility 305 (e.g., front wall 304) to facilitate the optimal view of the well construction system 100 by the rig personnel. The observation area 340 may be located on a side of the facility 305. The observation area 318 may be surrounded by or at least partially defined by a front window 324 permitting the rig personnel to look forward, two side windows 323, 325 permitting the rig personnel to look sideways (i.e., left and right), a lower window 326 permitting the rig personnel to look downwards, and one or more upper windows 327, 328 permitting the rig personnel to look upwards. The lower window 326 and/or at least one upper window 327 may extend diagonally with respect to the front window 324.

The control center 300 may comprise one or more control workstations within the facility 305. The workstations may be utilized by rig personnel to monitor and control the subsystems 211-217 and other portions of the well construction system 100. For example, the observation area 340 may contain a first control workstation 350 located adjacent the windows 323, 324, 325, 326, 328 and at least partially within the extended portion 342 of the observation area 340, such as may permit the rig personnel utilizing the control workstation 350 to have an unobstructed or otherwise optimal view of the drill string 120, the rig floor 114, and/or other portions of the well construction system 100. The observation area 340 may also contain a second control workstation 352 located adjacent (e.g., behind) the first control workstation 350 and adjacent the window 325, but not within the extended portion 342 of the observation area 340. The control workstation 352 may be elevated at least partially above the control workstation 350 to reduce the obstruction of view caused by the control workstation 350 and, thus, permit the rig personnel utilizing the control workstation 352 to view the drill string 120, the rig floor 114, and/or other portions of the well construction system 100 over the control workstation 350 via the front window 324. The control center 300 may also comprise a third control workstation 354 located adjacent the control workstations 350, 352 and adjacent the windows 321, 322, but not within the observation area 340. The control workstations 350, 352, 354 may be example implementations and comprise one or more features of the control workstation 197 shown in FIGS. 1 and 2.

The control center 300 may further contain a central controller 356 (e.g., a processing device, a computer, a server, a PLC, etc.) operable to provide control to one or more portions of the well construction system 100 and/or monitor operations of one or more portions of the well construction system 100. The central controller 356 may be an example implementation and comprise one or more features of the central controller 192 shown in FIGS. 1 and 2. The central controller 356 may be communicatively connected with the various surface and downhole well construction equipment described herein, and operable to receive sensor data from and transmit control data to such equipment to perform various operations described herein. The central controller 356 may be communicatively connected with one or more of the control workstations 350, 352, 354, such as may permit rig personnel using the control workstations 350, 352, 354 to monitor and control the various surface and downhole well construction equipment via the central controller 356 to perform various operations described herein. The central controller 356 may store executable programs, instructions, and/or operational parameters or set-points, including for implementing one or more aspects of the operations described herein. Although the central controller 356 is shown located within the facility 305, the central controller 356 may be located outside of the facility 305. Furthermore, although the central controller 356 is shown as a single device, the central controller 356 may be or comprise a plurality of equipment controllers collectively operable to provide control to one or more portions of the well construction system 100 and/or monitor operations of one or more portions of the well construction system 100.

The control workstations 350, 352, 354 may be operable to enter or otherwise communicate commands to the central controller 356 by the rig personnel and to display or otherwise communicate information from the central controller 356 to the rig personnel. One or more of the control workstations 350, 352, 354 may comprise an operator chair 360 and an HMI system comprising one or more input devices 362 (e.g., a keyboard, a mouse, a joystick, a touchscreen, a microphone, etc.) and one or more output devices 364 (e.g., a video monitor, a printer, audio speakers, a touchscreen, etc.). The input and output devices 362, 364 may be disposed in association with and/or integrated with the operator chair 360 to permit the rig personnel to enter commands or other information to the central controller 356 and receive information from the central controller 356 and other portions of the well construction system 100.

The control center 300 may further contain a BOP control station 370 (e.g., control panel) of the WC system 217 operable to monitor and control one or more portions of the WC system 217. For example, the BOP control station 370 may be communicatively connected with and operable to control the power unit 137, the BOP stack 130, and the annular preventer 132.

One or more portions of the supervisory system 250 shown in FIG. 2 may be installed within or otherwise disposed in association with the control center 300. For example, the supervisory controller 252 may be installed or otherwise disposed within the facility 305 of the control center 300. The supervisory controller 252 may be communicatively connected with the central controller 356 to communicatively connect the supervisory control system 250 with the rig control system 200 shown in FIG. 2. As described above, the supervisory controller 252 may be operable to communicate with the central controller 356, and to monitor and control the various equipment (e.g., actuators 241-247) of the subsystems 211-217 via the central controller 356.

The HMI 260 may be physically installed or otherwise disposed in association with one or more of the control workstations 350, 352, 354, such as may permit the rig personnel (e.g., the driller) using one or more of the control workstations 350, 352, 354 to also use the HMI 260. As described above, the HMI 260 may be usable by the rig personnel to monitor and control the supervisory control system 250 to monitor and control the well construction equipment of the well construction system 100 via the central controller 356. The HMI 260 may be communicatively connected with the supervisory controller 252 and operable for entering or otherwise communicating control data to the supervisory controller 252 by the rig personnel for controlling the supervisory control system 250 and the well construction equipment of the well construction system 100. The HMI 260 may be further operable for displaying or otherwise communicating sensor data and other information from the supervisory controller 252 to the rig personnel, thereby permitting the rig personnel to monitor the supervisory control system 250 and the well construction equipment of the well construction system 100.

Figure 6:
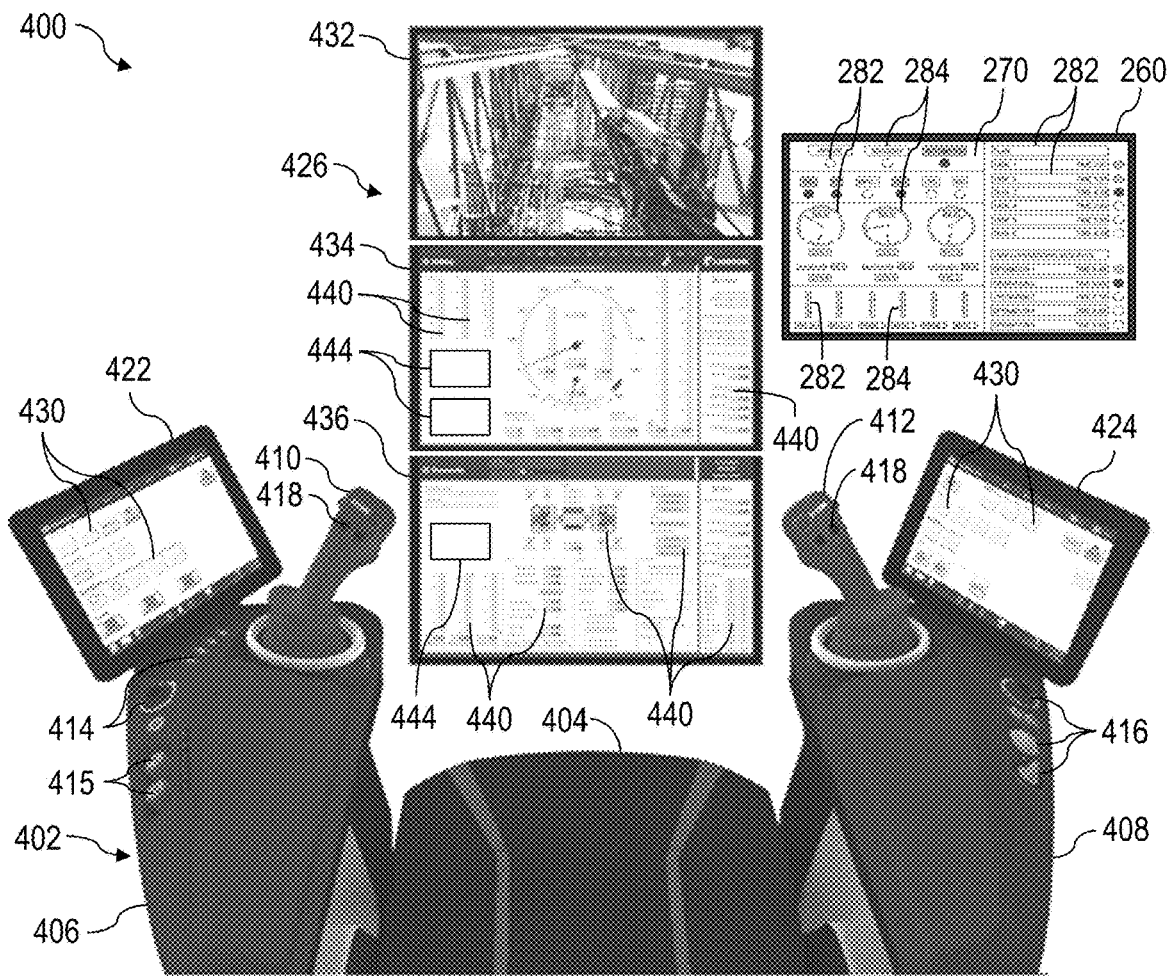
FIG. 6 is a top view of a portion of an example implementation of apparatus according to one or more aspects of the present disclosure.

FIG. 6 is a top view of a portion of an example implementation of a rig control workstation 400 communicatively connected with and operable to control the well construction system 100 shown in FIGS. 1 and 2 according to one or more aspects of the present disclosure. The control workstation 400 may facilitate receiving and displaying various information, such as sensor signals or data, control signals or data, processes taking place, well construction events being detected, and operational status of various well construction equipment of the subsystems 211-217 of the well construction system 100. The control workstation 400 may be an example implementation and comprise one or more features of the control workstations 197, 350, 352, 354 shown in FIGS. 1, 2, and 5, respectively. Accordingly, the following description refers to FIGS. 1, 2, 5, and 6, collectively.

The control workstation 400 comprises an operator chair 402 (e.g., driller's chair) and an HMI system comprising a plurality of input and output devices integrated with, supported by, or otherwise disposed in association with the operator chair 402. The input devices permit the rig personnel to enter commands or other information to control the wellsite equipment of the well construction system 100, and the output devices permit the rig personnel to receive sensor signals and other information indicative of operational status of the wellsite equipment. The operator chair 402 may include a seat 404, a left armrest 406, and a right armrest 408.

The input devices of the control workstation 400 may include a plurality of physical controls, such as a left joystick 410, a right joystick 412, and/or other physical controls 414, 415, 416, 418, such as buttons, keys, switches, knobs, dials, slider bars, a mouse, a keyboard, and a microphone. One or more of the joysticks 410, 412 and/or the physical controls 414, 415, 416 may be integrated into or otherwise supported by the corresponding armrests 406, 408 of the operator chair 402 to permit the rig personnel to operate these input devices from the operator chair 402. Furthermore, one or more of the physical controls 418 may be integrated into the corresponding joysticks 410, 412 to permit the rig personnel to operate these physical controls 418 while operating the joysticks 410, 412. The physical controls may comprise emergency stop (E-stop) buttons 415, which may be electrically connected to E-stop relays of one or more pieces of wellsite equipment (e.g., the iron roughneck 165, the THM 160, the drawworks 118, the top drive 116, etc.), such that the rig personnel can shut down the wellsite equipment during emergencies and other situations.

The output devices of the control workstation 400 may include one or more video output devices 426 (e.g., video monitors), printers, speakers, and other output devices disposed in association with the operator chair 402 and operable to display to the rig personnel sensor signals and other information indicative of operational status of the well construction system 100. The video output devices 426 may be implemented as one or more LCD displays, LED displays, plasma displays, cathode ray tube (CRT) displays, and/or other types of displays.

The video output devices 426 may be disposed in front of or otherwise adjacent the operator chair 402. The video output devices 426 may include a plurality of video output devices 432, 434, 436, each dedicated to displaying predetermined information in a predetermined (e.g., programmed) manner. Although the video output devices 426 are shown comprising three video output devices 432, 434, 436, the video output devices 426 may be or comprise one, two, four, or more video output devices.

The video output devices 432, 434, 436 may each display in a predetermined manner selected sensor signals or information indicative of operational status of a selected portion of the well construction system 100. For example, the video output devices 434, 436 may display sensor data generated by the various sensors (e.g., sensors 231-237) of the well construction system 100 to permit the rig personnel to monitor operational status of the well construction equipment of the subsystems 211-217. The information 440 may be displayed in the form of virtual or computer generated lists, menus, tables, graphs, bars, gauges, lights, and schematics, among other examples.

One or more of the video output devices 426 may be configured to display video signals (i.e., video feeds) generated by one or more of the video cameras 198. For example, the video output device 432 may be dedicated for displaying the video signals generated by one or more of the video cameras 198. When displaying the video signals from multiple video cameras 198, the video output device 432 may display multiple video windows, each displaying a corresponding video signal. Furthermore, one or more of the other video output devices 434, 436 may also display the video signals from one or more of the video cameras 198. For example, one or both of the video output devices 434, 436 may display one or more picture-in-picture (PIP) video windows 444, each displaying a video signal from a corresponding one of the video cameras 198. The PIP video windows 444 may be embedded or inset along or adjacent the sensor information 440. Sourcing (i.e., selection) of the video cameras 198 whose video signals are to be displayed on the video output devices 426 may be selected manually by the rig personnel or automated via the rig control system 200, such as based on detected operational events (e.g., well construction events, well construction operation stage, etc.) at the well construction system 100, such that video signals relevant to an operational event currently taking place are displayed.

The control workstation 400 may further comprise combination devices operable as both input and output devices to display information to the rig personnel and receive commands or information from the rig personnel. Such devices may be or comprise touchscreens 422, 424 (i.e., touchpads) operable to display a plurality of software (e.g., virtual, computer generated) buttons, switches, knobs, dials, icons, and/or other software controls 430 permitting the rig personnel to operate (e.g., click, selected, move) the software controls 430 via finger contact with the touchscreens 422, 424 to control the various wellsite equipment of the subsystems 211-217. The software controls 430 may also be operated by the physical controls 414, 416, the joysticks 410, 412, or other input devices of the control workstation 400. The software controls 430 and/or other features displayed on the touchscreens 422, 424 may also display sensor signals or data, operational settings, set-points, and/or status of selected wellsite equipment for viewing by the rig personnel. For example, the software controls 430 may change color, move in position or direction, and/or display the sensor information, set-points, and/or operational values (e.g., temperature, pressure, position). The touchscreens 422, 424 may be disposed on, supported by, or integrated into the armrests 406, 408 or other parts of the operator chair 402 to permit the rig personnel to operate the software controls 430 displayed on the touchscreens 422, 424 from the operator chair 402.

Each video output device 426 and touchscreen 422, 424 may display (i.e., generate) a plurality of display screens (i.e., an integrated display system), each displaying to the rig personnel selected sensor signals or information 440 indicative of operational status of selected portions of the well construction system 100 and software controls 430 for controlling selected portions of the well construction system 100, respectively. Each display screen may integrate the software controls 430 and/or sensor information 440 from one or more pieces of wellsite equipment (e.g., subsystems 211-217) with information generated by the rig control system 200 for viewing and/or operating by the rig personnel. The display screens may be shown or displayed alternately on one or more of the video output devices 426 and/or the touchscreens 422, 424 or simultaneously on one or more of these devices. The display screens intended to be displayed on the video output devices 426 and/or the touchscreens 422, 424 may be selected by the rig personnel via the physical controls 414, 416, 418 and/or software controls 430. The display screens intended to be displayed on the video output devices 426 and/or the touchscreens 422, 424 may also or instead be selected automatically by the rig control system 200 based on operational events detected (e.g., equipment failures, hazardous drilling conditions) or planned (e.g., changing phases or stages of the well construction operations) at the well construction system 100, such that information relevant to the operational event currently taking place is displayed. Each display screen generated by the touchscreens 422, 424 may display software controls 430 operable by the rig personnel to control the wellsite equipment associated with the software controls 430, and each display screen generated by the video output devices 426 may display information 440 indicative of operational status of the wellsite equipment associated with the information 440. Accordingly, the display screens displayed on the touchscreens 422, 424 may be referred to hereinafter as control screens, and the display screens displayed on the video output devices 426 may be referred to hereinafter as status screens.

The video output devices 426 may be operable to alternatingly display a plurality of status screens. Some of the status screens may display operational status of a well construction operation (e.g., tripping, drilling, tubular handling, etc.) involving a plurality of pieces of wellsite equipment operating in a coordinated manner to perform such operation, which may permit the rig personnel to monitor operational status or parameters of such operation on a single status screen. Some of the status screens may display operational status of a single piece of wellsite equipment or a subsystem (e.g., subsystem 211-217) of wellsite equipment, such as may permit the rig personnel to monitor operational status or parameters of a single piece of equipment or an equipment subsystem. As described above, the status screen and the corresponding operation, wellsite equipment, or equipment subsystem may be selected via the touchscreens 422, 424. The status screens that may be selected for display may include a tripping status screen displaying information indicative of operational status of the tripping operations, a drilling status screen displaying information indicative of operational status of the drilling operations, a tubular handing status screen displaying information indicative of operational status of the tubular handling operations, and a plurality of subsystem status screens each displaying information indicative of operational status of the corresponding subsystem of the well construction system 100. The status screens within the scope of the present disclosure may also or instead display information indicative of operational status of individual pieces of wellsite equipment described herein.

The touchscreens 422, 424 may be operable to alternatingly display a plurality of control screens (e.g., configuration screens) each displaying corresponding software controls 430, which may be operated by the rig personnel to set, adjust, configure, operate, or otherwise control individual pieces of wellsite equipment and/or equipment subsystems (e.g., subsystems 211-217) of the well construction system 100 via finger contact with the touchscreens 422, 424 from the operator chair 402.

The HMI 260 shown in FIGS. 2 and 5 may be physically installed or otherwise disposed in association with the control workstation 400, such as may permit the rig personnel (e.g., the driller) using the control workstation 400 to also use the HMI 260. For example, the HMI 260 may be installed or otherwise disposed adjacent the video output devices 426 and/or the touchscreens 422, 424. As described above, the HMI 260 may be usable by the rig personnel to monitor and control the supervisory control system 250 to monitor and control the well construction equipment of the well construction system 100 via the central controller 192, 356. The HMI 260 may be operable for entering or otherwise communicating control data to the supervisory controller 252 by the rig personnel for controlling the supervisory control system 250 and the well construction equipment of the well construction system 100. The HMI 260 may be further operable for displaying or otherwise communicating to the rig personnel information 282, such as settings, set-points, and/or status of selected well construction equipment, settings, set-points, and/or status of the supervisory control system 250, and/or current or future operations or well construction tasks of a well construction plan being performed by the well construction equipment, thereby permitting the rig personnel to monitor the supervisory control system 250 and the well construction equipment of the well construction system 100.

The HMI 260 may be implemented as a touchscreen (i.e., touchpad) and, thus, operable as both an input and output device to display the information 282 to the rig personnel and receive control data and other information from the rig personnel. The HMI 260 may also or instead be implemented as one or more video output devices (e.g., video monitors) disposed in association with the control workstation 400 and operable to display the information 282 to the rig personnel. The information 282 may be displayed in the form of virtual or computer generated lists, menus, tables, graphs, bars, gauges, lights, and schematics, among other examples. The HMI 260 may display a plurality of software (e.g., virtual, computer generated) buttons, switches, knobs, dials, icons, and/or other software controls 284 permitting the rig personnel to operate (e.g., click, selected, move) the software controls 284 via finger contact with the HMI 260 to control the supervisory control system 250. The software controls 284 may also or instead be operated by the physical controls 414, 416, the joysticks 410, 412, or other input devices of the control workstation 400. The HMI 260 may be operable to display a plurality of display screens 270, each operable to display various information 282 and software controls 284.

Similarly as described above with respect to the display screen 270 shown in FIG. 3, the entire windows 272, 274 or just the virtual or software buttons of the windows 272, 274 may be displayed on one or more devices of the control workstation 400 to permit the rig personnel using the workstation 197 to select the mode of operation of the supervisory control system 250 and the equipment which the supervisory control system 250 controls. For example, the windows 272, 274 or the virtual or software buttons of the windows 272, 274 may be displayed on one or more of the video output devices 426, such as may permit the rig personnel using the workstation 197 to select the mode of operation of the supervisory control system 250 and the equipment which the supervisory control system 250 controls via operation of one or more of the physical controls 414, 416, the joysticks 410, 412, or other input devices. The windows 272, 274 or the virtual or software buttons of the windows 272, 274 may also or instead be displayed on one or more of the touchscreens 422, 424, such as may permit the rig personnel using the workstation 197 to select the mode of operation of the supervisory control system 250 and the equipment which the supervisory control system 250 controls via finger contact with one or more of the touchscreens 422, 424.

Figure 7:
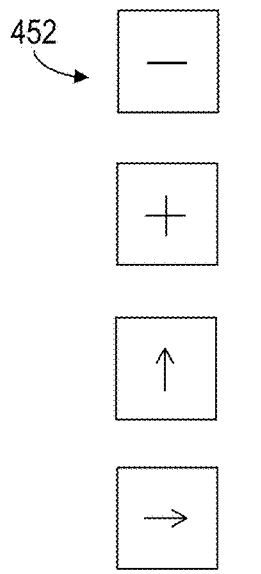
FIGS. 7-9 are example implementations of software controls displayed by the apparatus shown in FIG. 6 according to one or more aspects of the present disclosure.
Figure 8:
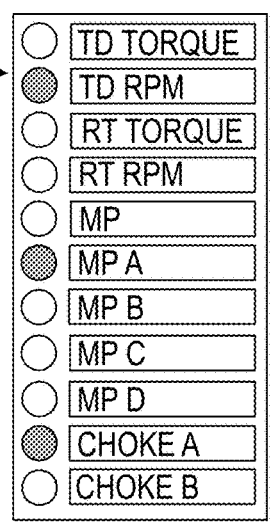
Figure 9:
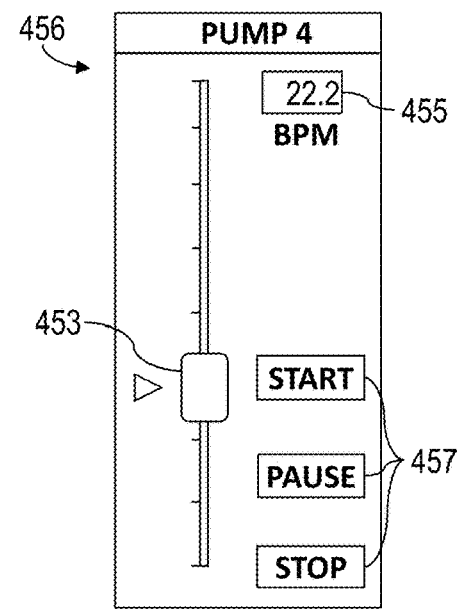

FIGS. 7-9 are example implementations of software controls 452, 454, 456 that may be displayed on the touchscreens 422, 424 and the HMI 260, and operated by the rig personnel. The software controls 452, 454, 456 may be pressed, clicked, selected, moved, or otherwise operated via the physical controls 414, 416 and/or via finger contact by the rig personnel to increase, decrease, change, or otherwise enter operational parameters, set-points, and/or instructions for controlling one or more pieces of well construction equipment of the well construction system 100. The software controls 452, 454, 456 may also display the entered and/or current operational parameters on or in association with the software controls 452, 454, 456 for viewing by the rig personnel. The operational parameters, set-points, and/or instructions associated with the software controls 452, 454, 456 may include equipment operational status (e.g., on or off, up or down, set or release, position, speed, temperature, etc.), drilling parameters (e.g., depth, hook load, torque, etc.), auxiliary parameters (e.g., vibration data of a pump), and fluid parameters (e.g., flow rate, pressure, temperature, etc.), among other examples.

The software controls 452 may be or comprise software buttons, which may be operated to increase, decrease, change, or otherwise enter different operational parameters, set-points, and/or instructions for controlling one or more portions of the well construction system 100 associated with the software controls 452. The software controls 454 may be or comprise a list or menu of items (e.g., equipment, processes, operational stages, equipment subsystems, etc.) related to one or more aspects of the well construction system 100, which may be operated to select one or more items on the list. The selected items may be highlighted, differently colored, or otherwise indicated, such as via a checkmark, a circle, or a dot appearing in association with the selected items. The software controls 456 may be or comprise a combination of different software controls, which may be operated to increase, decrease, change, or otherwise enter different operational parameters, set-points, and/or instructions for controlling one or more portions of the well construction system 100 associated with the software controls 456, such as a pump of the well construction system 100. The software controls 456 may include a slider 453, which may be moved or otherwise operated along a graduated bar to increase, decrease, or otherwise change pump speed or another operational parameter associated with the slider bar 453. The entered pump speed may be shown in a display window 455. The software controls 456 may also include software buttons 457, such as may be operated to start, pause, and stop operation of the pump or another portion of the well construction system 100 associated with the software buttons 457.

Figure 10:
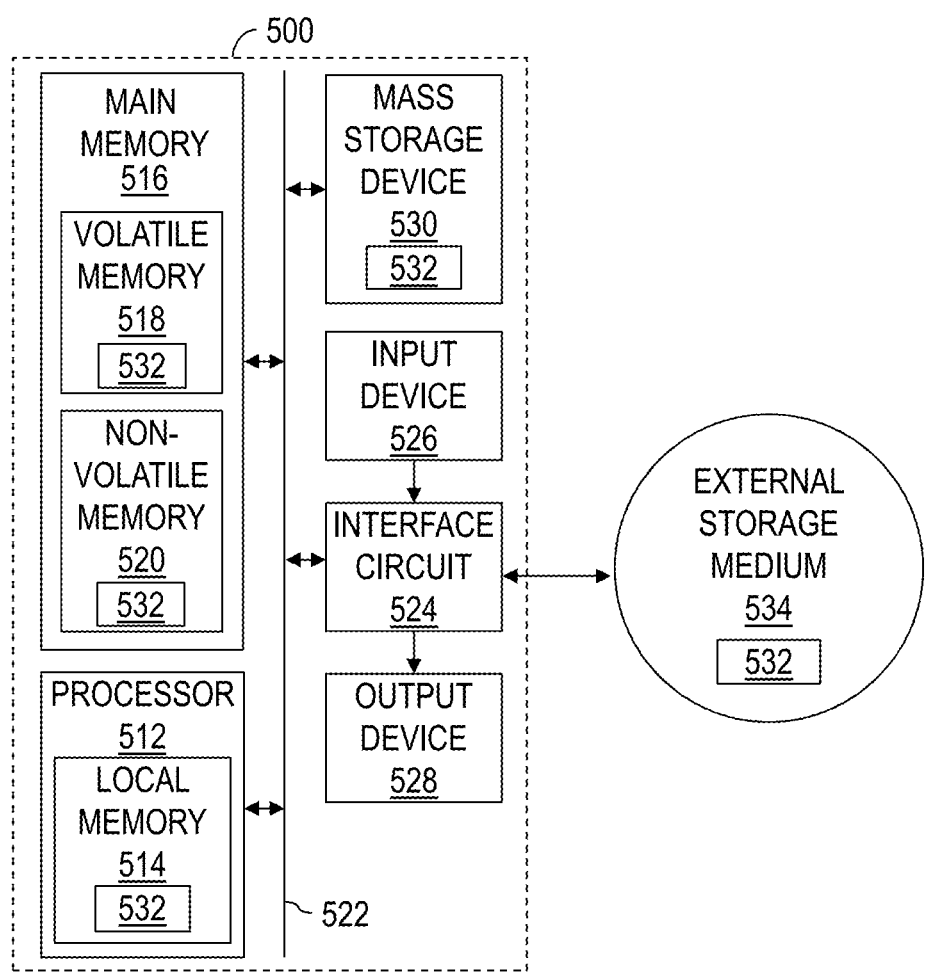
FIG. 10 is a schematic view of at least a portion of an example implementation of apparatus according to one or more aspects of the present disclosure.

FIG. 10 is a schematic view of at least a portion of an example implementation of a processing device 500 (or system) according to one or more aspects of the present disclosure. The processing device 500 may be or form at least a portion of one or more equipment controllers and/or other electronic devices shown in one or more of the FIGS. 1-9. Accordingly, the following description refers to FIGS. 1-10, collectively.

The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 500 may be or form at least a portion of the rig control system 200, including the downhole controller 188, the central controller 192, the local controllers 221-227, and the control workstations 197, 350, 352, 354, 400. Although it is possible that the entirety of the processing device 500 is implemented within one device, it is also contemplated that one or more components or functions of the processing device 500 may be implemented across multiple devices, some or an entirety of which may be at the wellsite and/or remote from the wellsite.

The processing device 500 may comprise a processor 512, such as a general-purpose programmable processor. The processor 512 may comprise a local memory 514, and may execute machine-readable and executable program code instructions 532 (i.e., computer program code) present in the local memory 514 and/or another memory device. The processor 512 may execute, among other things, the program code instructions 532 and/or other instructions and/or programs to implement the example methods and/or operations described herein. For example, the program code instructions 532, when executed by the processor 512 of the processing device 500, may cause the processor 512 to receive and process (e.g., compare) sensor data (e.g., sensor measurements) and output information indicative of accuracy the sensor data and, thus, the corresponding sensors according to one or more aspects of the present disclosure. The program code instructions 532, when executed by the processor 512 of the processing device 500, may also or instead cause one or more portions or pieces of wellsite equipment of a well construction system to perform the example methods and/or operations described herein. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 500 may be in communication with various sensors, video cameras, actuators, processing devices, equipment controllers, and other devices of the well construction system via the interface circuit 524. The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit rig personnel to enter the program code instructions 532, which may be or comprise control commands, operational parameters, operational set-points, I/O interface settings, communication gateway settings, a well construction drill plan, and/or database of operational sequences. The program code instructions 732 may further comprise modeling or predictive routines, equations, algorithms, processes, applications and/or other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 732 may include program instructions or computer program code that, when executed by the processor 712, may perform and/or cause performance of example methods, processes, and/or operations described herein.

In view of the entirety of the present disclosure, including the figures and the claims, a person having ordinary skill in the art will readily recognize that the present disclosure introduces an apparatus comprising a supervisory control system installable in association with a well construction rig, wherein the well construction rig is operable to perform well construction operations to construct a planned well at a wellsite, and wherein the supervisory control system comprises: (A) a supervisory controller communicatively connectable with a rig control system of the well construction rig, wherein the rig control system is communicatively connected with and operable to control well construction equipment of the well construction rig, wherein the rig control system comprises a rig control workstation usable by personnel to control the well construction equipment, and wherein the supervisory controller comprises a processing device and a memory storing an executable program code, which when executed by the processing device, causes the supervisory controller to: (1) select an operational sequence to be performed by the well construction equipment based on an operational status of the well construction equipment and a well construction plan input into the supervisory controller; and (2) control the well construction equipment via the rig control system to cause the well construction equipment to perform the selected operational sequence; and (B) a supervisory HMI communicatively connected with the supervisory controller, wherein the supervisory HMI is usable by the personnel to control the supervisory control system.

The supervisory HMI may be further operable to display to the personnel information indicative of the selected operational sequence to be performed by the well construction equipment, and the rig control workstation may be further usable by the personnel to permit the supervisory controller to control the well construction equipment.

The supervisory HMI may be installable in association with the rig control workstation.

The well construction plan may comprise at least one of: properties of a subterranean formation through which the planned well is to be drilled; a path along which the planned well is to be drilled through the formation; depth of the planned well; specifications of the well construction equipment to be used to perform the well construction operations; and specifications of tubulars to be used to perform the well construction operations.

The supervisory control system may further comprise a memory device storing a database of operational sequences, and the supervisory controller may be operable to select the operational sequence to be performed by the well construction equipment from the database. In such implementations, among others within the scope of the present disclosure, the well construction system may further comprise a plurality of sensors associated with the well construction equipment, wherein the sensors may be operable to output sensor data indicative of the operational status of the well construction equipment, and wherein the supervisory controller may be further operable to: continuously receive the sensor data; and continuously select from the database an optimal one of the operational sequences to be performed by the well construction equipment based on the well construction plan and the sensor data.

The well construction plan may comprise a plurality of planned tasks to be performed by the well construction equipment as part of the well construction operations, the supervisory control system may further comprise a memory device storing a database of operational sequences, each of the planned tasks may be associated with a plurality of the operational sequences stored in the database, and each operational sequence associated with one of the planned tasks may comprise a different plurality of operations to be performed by the well construction equipment to perform the one of the planned tasks.

The well construction plan may comprise a plurality of planned tasks to be performed by the well construction equipment as part of the well construction operations, and the supervisory controller may be further operable to: select the operational sequence to be performed by the well construction equipment to perform a selected one of the planned tasks; and control the well construction equipment via the rig control system to cause the well construction equipment to automatically perform the selected operational sequence to perform the selected one of the planned tasks without manual control of the well construction equipment by the personnel via the rig control workstation. In such implementations, among others within the scope of the present disclosure, the selected operational sequence may be a previously selected operational sequence, and the supervisory controller may be further operable to: monitor the well construction operations to detect a well construction event; stop the performance of the previously selected operational sequence when the well construction event is detected; select a different operational sequence based on the detected well construction event to be performed by the well construction equipment to perform the selected one of the planned tasks; and control the well construction equipment via the rig control system to cause the well construction equipment to automatically perform the selected different operational sequence to perform the selected one of the planned tasks without manual control of the well construction equipment by the personnel via the rig control workstation. The selected one of the planned tasks may comprise drilling a selected portion of the planned well, the supervisory controller may be further operable to select the operational sequence to be performed by the well construction equipment based on the well construction plan, and the well construction plan may comprise at least one of: specifications of the well construction equipment; properties of a subterranean formation through which the selected portion of the planned well is to be drilled; and a path along which the selected portion of the planned well is to be drilled through the subterranean formation.

The supervisory control system may be further operable in: an automated mode in which the supervisory controller controls the well construction equipment via the rig control system to cause the well construction equipment to perform the selected operational sequence; and a manual mode in which the supervisory controller does not control the well construction equipment via the rig control system thereby permitting the personnel to use the rig control workstation to control the well construction equipment.

The supervisory control system may be further operable in an advisory mode in which: the supervisory controller does not control the well construction equipment via the rig control system; and the supervisory HMI displays to the personnel the information indicative of the selected operational sequence thereby permitting the personnel to use the rig control workstation to cause the well construction equipment to perform the selected operational sequence.

The rig control workstation and/or the supervisory HMI may be operable to display a mode selection area usable by the personnel to selectively permit the supervisory controller to control one or more of the well construction equipment.

Control of the well construction equipment by the supervisory controller may be stopped when: communication between the supervisory control system and the rig control system is lost; and/or the personnel uses the rig control workstation to manually control the well construction equipment.

The supervisory controller may be or comprise a backend server.

The well construction equipment may comprise at least one of: a drilling fluid pump system operable to pump drilling fluid; drill string hoisting equipment operable to lift a drill string; and drill string rotation equipment operable to rotate the drill string.

The rig control system may further comprise a central controller communicatively connected with and operable to control the well construction equipment, the supervisory controller may be communicatively connectable with the central controller, and the central controller is operable as an I/O interface for matching inputs and outputs of the supervisory controller with corresponding inputs and outputs of each piece of the well construction equipment. In such implementations, among others within the scope of the present disclosure, the central controller may be further operable as a communication gateway for translating communications exchanged between the supervisory controller and the rig control system.

The rig control system may further comprise: (A) a communication field bus; (B) a plurality of local controllers, each communicatively connected with: (1) the communication field bus; and (2) a corresponding one or more pieces of the well construction equipment; and (C) a central controller communicatively connected with: (1) the communication field bus; and (2) each local controller, via the communication field bus. The supervisory controller may be communicatively connectable with the central controller. The central controller may be operable as an I/O interface for matching inputs and outputs of the supervisory controller with corresponding inputs and outputs of each local controller. The central controller may be further operable as a communication gateway for translating communications exchanged between the supervisory controller and the central controller. The communication gateway may be operable to: receive a first information using a first communication protocol from the supervisory controller; transmit the first information using a second communication protocol to the central controller; receive a second information using the second communication protocol from the central controller; and transmit the second information using the first communication protocol to the supervisory controller.

The present disclosure also introduces an apparatus comprising a supervisory control system installable in association with a well construction rig, wherein: the well construction rig is operable to perform well construction operations to construct a planned well at a wellsite; the supervisory control system comprises a supervisory controller communicatively connectable with a central controller of a rig control system of the well construction rig; the rig control system is communicatively connected with and operable to control well construction equipment of the well construction rig; the supervisory controller comprises a processing device and a memory storing an executable program code, which when executed by the processing device causes the supervisory controller to control the well construction equipment via the rig control system to cause the well construction equipment to perform the well construction operations; and the central controller is operable as an I/O interface for matching inputs and outputs of the supervisory controller with corresponding inputs and outputs of at least one piece of the well construction equipment.

The central controller may be further operable as a communication gateway for translating communications exchanged between the supervisory controller and the central controller. In such implementations, among others within the scope of the present disclosure, the communication gateway may be operable to: receive first information from the supervisory controller using a first communication protocol; transmit the first information to the central controller using a second communication protocol; receive second information from the central controller using the second communication protocol; and transmit the second information to the supervisory controller using the first communication protocol.

The rig control system may further comprise: (A) a communication field bus; and (B) a plurality of local controllers, each communicatively connected with: (1) the communication field bus; and (2) a corresponding one or more pieces of the well construction equipment. In such implementations, among others within the scope of the present disclosure, the central controller may be communicatively connected with: the communication field bus; and each local controller, via the communication field bus.

The rig control system may comprise a rig control workstation usable by personnel to control the well construction equipment, the supervisory control system may further comprise a supervisory HMI communicatively connected with the supervisory controller, and the supervisory HMI may be usable by the personnel to control the supervisory control system. The supervisory HMI may be installable in association with the rig control workstation.

The supervisory controller may be further operable to: select an operational sequence to be performed by the well construction equipment based on an operational status of the well construction equipment and a well construction plan input into the supervisory controller; and control the well construction equipment via the rig control system to cause the well construction equipment to perform the selected operational sequence. The well construction plan may comprise at least one of: properties of a subterranean formation through which the planned well is to be drilled; a path along which the planned well is to be drilled through the formation; a depth of the planned well; specifications of the well construction equipment to be used to perform the well construction operations; and specifications of tubulars to be used to perform the well construction operations. The supervisory control system may further comprise a memory device storing a database of operational sequences, and the supervisory controller may be further operable to select the operational sequence to be performed by the well construction equipment from the database.

The present disclosure also introduces an apparatus comprising a supervisory control system installable in association with a well construction rig, wherein: (A) the well construction rig is operable to perform well construction operations to construct a planned well at a wellsite; (B) the supervisory control system comprises a supervisory controller communicatively connectable with a rig control system of the well construction rig; (C) the rig control system is communicatively connected with and operable to control well construction equipment of the well construction rig; (D) the supervisory controller comprises a processing device and a memory storing an executable program code, which when executed by the processing device causes the supervisory controller to control the well construction equipment via the rig control system to cause the well construction equipment to perform the well construction operations; and (E) the rig control system comprises: (1) an I/O interface for matching inputs and outputs of the supervisory controller with corresponding inputs and outputs of at least one piece of the well construction equipment; and (2) a communication gateway for translating communication between the supervisory controller and the rig control system.

The rig control system may further comprise a central controller communicatively connected with and operable to control the well construction equipment, the supervisory controller may be communicatively connectable with the central controller, and the central controller may be operable as the I/O interface and the communication gateway. In such implementations, among others within the scope of the present disclosure, the communication gateway may be operable to: receive first information using a first communication protocol from the supervisory controller; transmit the first information using a second communication protocol to the central controller; receive second information using the second communication protocol from the central controller; and transmit the second information using the first communication protocol to the supervisory controller. The rig control system may further comprise: (A) a communication field bus; and (B) a plurality of local controllers, each communicatively connected with: (1) the communication field bus; and (2) a corresponding one or more pieces of the well construction equipment. The central controller may be communicatively connected with: the communication field bus; and each local controller, via the communication field bus.

The rig control system may comprise a rig control workstation usable by personnel to control the well construction equipment, the supervisory control system may further comprise a supervisory HMI communicatively connected with the supervisory controller, and the supervisory HMI may be usable by the personnel to control the supervisory control system. The supervisory HMI may be installable in association with the rig control workstation.

The supervisory controller may be further operable to: select an operational sequence to be performed by the well construction equipment based on an operational status of the well construction equipment and a well construction plan input into the supervisory controller; and control the well construction equipment via the rig control system to cause the well construction equipment to perform the selected operational sequence. The well construction plan may comprise at least one of: properties of a subterranean formation through which the planned well is to be drilled; a path along which the planned well is to be drilled through the formation; depth of the planned well; specifications of the well construction equipment to be used to perform the well construction operations; and specifications of tubulars to be used to perform the well construction operations. The supervisory control system may further comprise a memory device storing a database of operational sequences, and the supervisory controller may be operable to select from the database the operational sequence to be performed by the well construction equipment.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a supervisory control system installable in association with a well construction rig, wherein the well construction rig is operable to perform well construction operations to construct a planned well at a wellsite, and wherein the supervisory control system comprises:
a supervisory controller communicatively connectable with a rig control system of the well construction rig, wherein the rig control system is communicatively connected with and operable to control well construction equipment of the well construction rig, wherein the rig control system comprises a rig control workstation usable by personnel to control the well construction equipment, wherein the supervisory controller comprises a processing device and a memory storing a program code, and wherein execution of the program code by the processing device causes the supervisory controller to:
select an operational sequence to be performed by the well construction equipment based on operational status of the well construction equipment and a well construction plan input into the supervisory controller; and
control the well construction equipment, via the rig control system, to cause the well construction equipment to perform the selected operational sequence; and
a supervisory human-machine interface (HMI) communicatively connected with the supervisory controller and usable by the personnel to control the supervisory control system, wherein the HMI displays descriptions of well construction tasks of the well construction plan and displays descriptions of individual operations of a current selected operational sequence that corresponds to a current one of the well construction tasks.

2. The apparatus of claim 1 wherein the rig control workstation is further usable by the personnel to permit the supervisory controller to control the well construction equipment during performance of the selected operational sequence.

3. The apparatus of claim 1 wherein the supervisory control system further comprises a memory device storing a database of operational sequences, and wherein the selected operational sequence is selected from the database.

4. The apparatus of claim 3 wherein the well construction system further comprises a plurality of sensors associated with the well construction equipment and operable to output sensor data indicative of the operational status of the well construction equipment, and wherein the supervisory controller is further operable to:
continuously receive the sensor data; and
continuously select from the database an optimal one of the operational sequences to be performed by the well construction equipment based on the well construction plan and the sensor data.

5. The apparatus of claim 1 wherein:
the well construction tasks are to be performed by the well construction equipment as part of the well construction operations;
the supervisory control system further comprises a memory device storing a database of operational sequences;
each of the tasks is associated with a plurality of the operational sequences stored in the database; and
each operational sequence associated with one of the tasks comprises a different plurality of operations to be performed by the well construction equipment to perform the one of the tasks.

6. The apparatus of claim 1 wherein the well construction tasks are to be performed by the well construction equipment as part of the well construction operations, and wherein the supervisory controller is further operable to:

select the operational sequence to be performed by the well construction equipment to perform a selected one of the tasks; and control the well construction equipment via the rig control system to cause the well construction equipment to automatically perform the selected operational sequence to perform the selected one of the tasks without manual control of the well construction equipment by the personnel via the rig control workstation.

7. The apparatus of claim 6 wherein the selected operational sequence is a previously selected operational sequence, and wherein the supervisory controller is further operable to:

monitor the well construction operations to detect a well construction event;

stop the performance of the previously selected operational sequence when the well construction event is detected;

select a different operational sequence based on the detected well construction event to be performed by the well construction equipment to perform the selected one of the tasks; and control the well construction equipment via the rig control system to cause the well construction equipment to automatically perform the selected different operational sequence to perform the selected one of the tasks without manual control of the well construction equipment by the personnel via the rig control workstation.

8. The apparatus of claim 6 wherein the selected one of the tasks comprises drilling a selected portion of the planned well, wherein the supervisory controller is further operable to select the operational sequence to be performed by the well construction equipment based on the well construction plan, and wherein the well construction plan comprises at least one of:

specifications of the well construction equipment;

properties of a subterranean formation through which the selected portion of the planned well is to be drilled; and a path along which the selected portion of the planned well is to be drilled through the formation.

9. The apparatus of claim 1 wherein the rig control workstation and/or the supervisory HMI is operable to display a mode selection area usable by the personnel to selectively permit the supervisory controller to control one or more components of the well construction equipment.

10. The apparatus of claim 1, wherein the HMI displays status indicators for the well construction tasks of the well construction plan and displays status indicators for the individual operations of the current selected operational sequence that corresponds to the current one of the well construction tasks.

11. The apparatus of claim 1, wherein the HMI displays times for the well construction tasks of the well construction plan and displays times for the individual operations of the current selected operational sequence that corresponds to the current one of the well construction tasks.

12. An apparatus comprising:

a supervisory control system installable in association with a well construction rig, wherein:

the well construction rig is operable to perform well construction operations to construct a planned well at a wellsite;

the supervisory control system comprises a supervisory controller communicatively connectable with a central controller of a rig control system of the well construction rig;

the rig control system is communicatively connected with and operable to control well construction equipment of the well construction rig;

the supervisory controller comprises a processing device and a memory storing a program code, wherein execution of the program code by the processing device causes the supervisory controller to control the well construction equipment via the rig control system to cause the well construction equipment to perform the well construction operations; and the central controller is operable as an input/output (I/O) interface for matching inputs and outputs of the supervisory controller with corresponding inputs and outputs of at least one piece of the well construction equipment, wherein the supervisory controller is further operable to:

select an operational sequence to be performed by the well construction equipment based on operational status of the well construction equipment and a well construction plan input into the supervisory controller;

control the well construction equipment, via the rig control system, to cause the well construction equipment to perform the selected operational sequence; and output display descriptions of well construction tasks of the well construction plan and display descriptions of individual operations of a current selected operational sequence that corresponds to a current one of the well construction tasks.

13. The apparatus of claim 12 wherein the central controller is further operable as a communication gateway for translating communications exchanged between the supervisory controller and the central controller.

14. The apparatus of claim 12 wherein:

the rig control system further comprises:

a communication field bus; and a plurality of local controllers, each communicatively connected with:

the communication field bus; and a corresponding one or more pieces of the well construction equipment; and the central controller is communicatively connected with:

the communication field bus; and each local controller, via the communication field bus.

15. The apparatus of claim 12 wherein:

the rig control system comprises a rig control workstation usable by personnel to control the well construction equipment;

the supervisory control system further comprises a supervisory human-machine interface (HMI) communicatively connected with the supervisory controller; and the supervisory HMI is usable by the personnel to control the supervisory control system, wherein the supervisory HMI.

16. The apparatus of claim 15 wherein the supervisory HMI is installable in association with the rig control workstation to display the display descriptions of the well construction tasks of the well construction plan and the display descriptions of the individual operations of the current selected operational sequence that corresponds to the current one of the well construction tasks.

17. An apparatus comprising:
a supervisory control system installable in association with a well construction rig, wherein:
the well construction rig is operable to perform well construction operations to construct a planned well at a wellsite;
the supervisory control system comprises a supervisory controller communicatively connectable with a rig control system of the well construction rig;
the rig control system is communicatively connected with and operable to control well construction equipment of the well construction rig;
the supervisory controller comprises a processing device and a memory storing a program code, wherein execution of the program code by the processing device causes the supervisory controller to control the well construction equipment via the rig control system to cause the well construction equipment to perform the well construction operations, wherein the supervisory controller is further operable to:
select an operational sequence to be performed by the well construction equipment based on an operational status of the well construction equipment and a well construction plan input into the supervisory controller; and
control the well construction equipment, via the rig control system, to cause the well construction equipment to perform the selected operational sequence; and
output display descriptions of well construction tasks of the well construction plan and display descriptions of individual operations of a current selected operational sequence that corresponds to a current one of the well construction tasks; and
the rig control system comprises:
an input/output (I/O) interface for matching inputs and outputs of the supervisory controller with corresponding inputs and outputs of at least one piece of the well construction equipment; and
a communication gateway for translating communication between the supervisory controller and the rig control system.

18. The apparatus of claim 17 wherein the rig control system further comprises a central controller communicatively connected with and operable to control the well construction equipment,
wherein the supervisory controller is communicatively connectable with the central controller, and
wherein the central controller is operable as the I/O interface and the communication gateway.

19. The apparatus of claim 17 wherein:
the rig control system comprises a rig control workstation usable by personnel to control the well construction equipment;
the supervisory control system further comprises a supervisory human-machine interface (HMI) communicatively connected with the supervisory controller; and
the supervisory HMI is usable by the personnel to control the supervisory control system.

20. The apparatus of claim 19 wherein the supervisory HMI is installable in association with the rig control workstation to display the display descriptions of the well construction tasks of the well construction plan and the display descriptions of the individual operations of the current selected operational sequence that corresponds to the current one of the well construction tasks.

* * * * *